US009055152B2

(12) United States Patent
Hao et al.

(10) Patent No.: US 9,055,152 B2
(45) Date of Patent: *Jun. 9, 2015

(54) MANAGING VISUAL VOICEMAIL FROM MULTIPLE DEVICES

(71) Applicant: Verizon Patent and Licensing Inc., Arlington, VA (US)

(72) Inventors: Jack Jianxiu Hao, Acton, MA (US); Diego Sebastian Rozensztejn, Brighton, MA (US); Guillermo Ortiz, Vancouver, WA (US); Bradford A. Jackvony, Wakefield, MA (US); Gaurav D. Mehta, Brookline, MA (US); Okeno Palmer, Woburn, MA (US); Dahai Ren, Lincoln, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,826

(22) Filed: Jun. 16, 2014

(65) Prior Publication Data

US 2014/0294164 A1 Oct. 2, 2014

Related U.S. Application Data

(63) Continuation of application No. 12/236,808, filed on Sep. 24, 2008, now Pat. No. 8,774,374.

(60) Provisional application No. 61/013,549, filed on Dec. 13, 2007, provisional application No. 61/018,044, filed on Dec. 31, 2007.

(51) Int. Cl.
*H04M 11/00* (2006.01)
*H04M 3/533* (2006.01)
*H04M 3/537* (2006.01)
*H04M 3/42* (2006.01)

(52) U.S. Cl.
CPC ...... *H04M 3/53333* (2013.01); *H04M 3/42153* (2013.01); *H04M 3/53325* (2013.01); *H04M 3/537* (2013.01); *H04M 2203/253* (2013.01); *H04M 2215/2073* (2013.01)

(58) Field of Classification Search
CPC .............. H04M 3/53325; H04M 3/54; H04M 2203/253
USPC .......... 379/88.12, 88.13, 88.17, 88.22, 88.25, 379/88.18; 455/414.1
See application file for complete search history.

(56) References Cited

U.S. PATENT DOCUMENTS 5,684,862 A * 11/1997 Finnigan .................... 379/88.22
8,155,282 B2 * 4/2012 Thaper et al. .............. 379/88.18

(Continued)

*Primary Examiner* — Lisa Hashem

(57) ABSTRACT

A network device may include a memory to store a database including voicemail message information associated with a voicemail mailbox, a transmitter, and a receiver. The transmitter may send a notification to each of a plurality of communication devices, the notification including an indication of a number of new voicemail messages in the voicemail mailbox, an indication of a total number of voicemail messages in the voicemail mailbox, and an identifier of a most recent voicemail message in the voicemail mailbox, where each of the plurality of communication devices uses the notification signal to determine whether to request a list of voicemail messages. The receiver may receive, from one of the communication devices in response to the notification, a request for the list of voicemail messages associated with voicemail message information stored in the database. The transmitter may sends, to the one of the plurality of communications devices, the list of voicemail messages.

20 Claims, 19 Drawing Sheets

(56) References Cited

U.S. PATENT DOCUMENTS

| | | | |
|---|---|---|---|
| 8,918,083 B2* | 12/2014 | Balannik et al. | 455/412.1 |
| 2002/0174184 A1* | 11/2002 | Bouchard | 709/206 |
| 2003/0142798 A1* | 7/2003 | Gavette et al. | 379/88.12 |
| 2004/0076272 A1* | 4/2004 | Zafar et al. | 379/88.13 |
| 2006/0234683 A1* | 10/2006 | Amin | 455/413 |
| 2012/0163567 A1* | 6/2012 | Hao et al. | 379/88.13 |
| 2013/0268611 A1* | 10/2013 | Pattan | 709/206 |

* cited by examiner

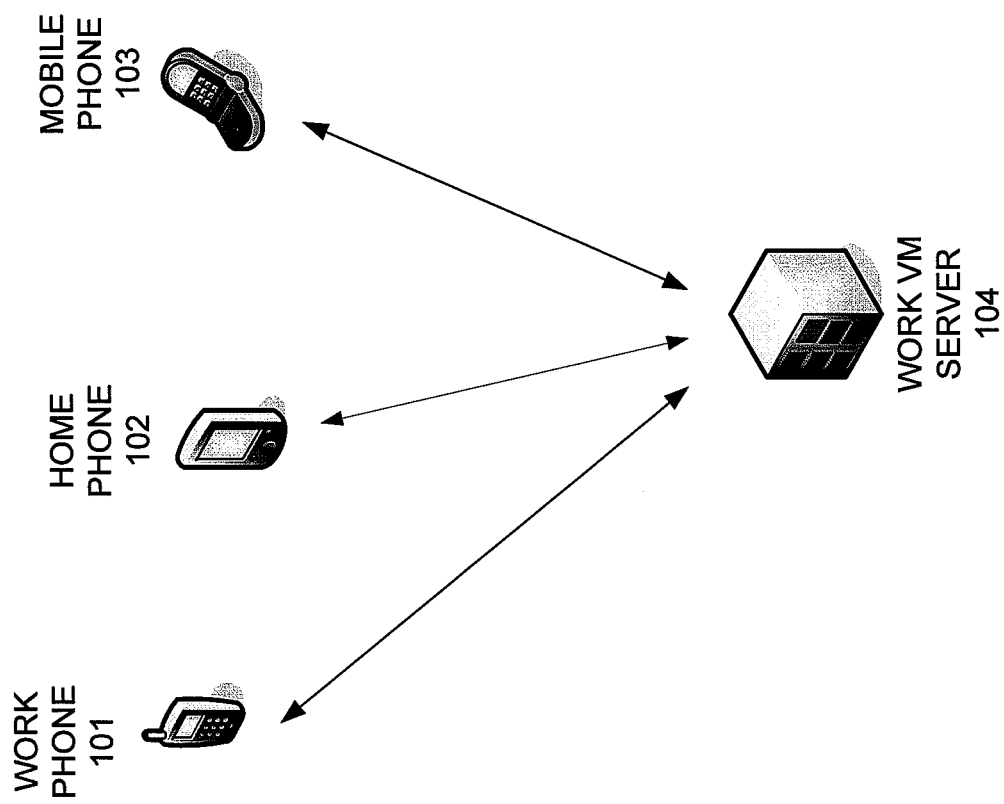

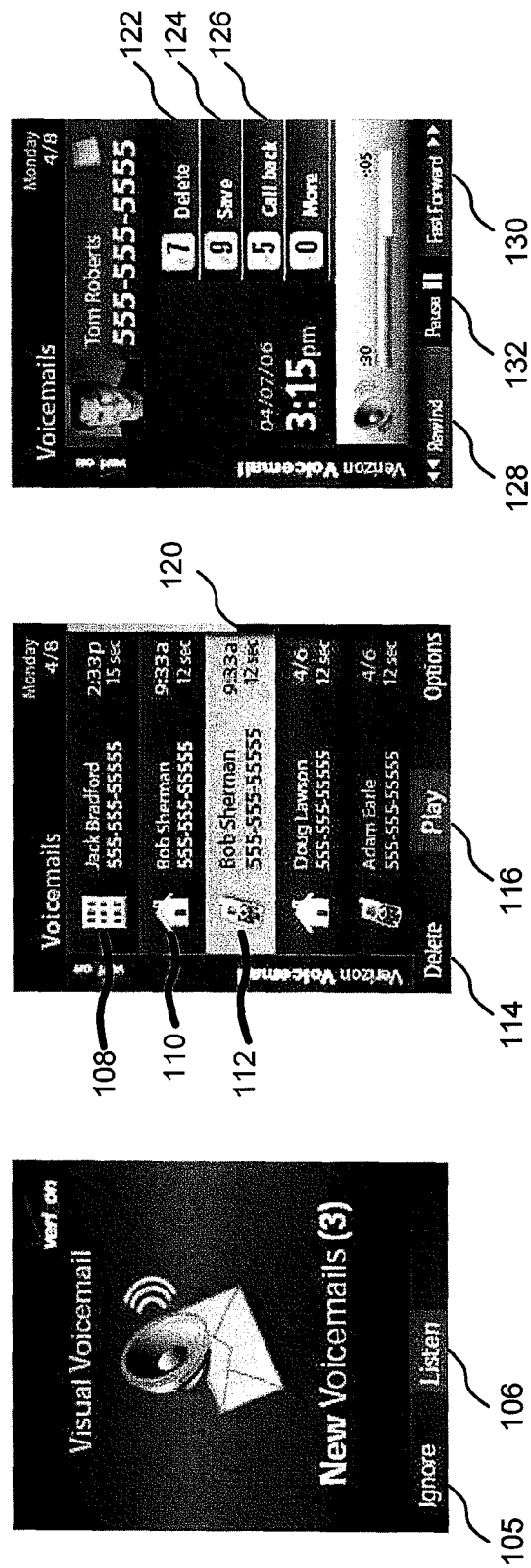

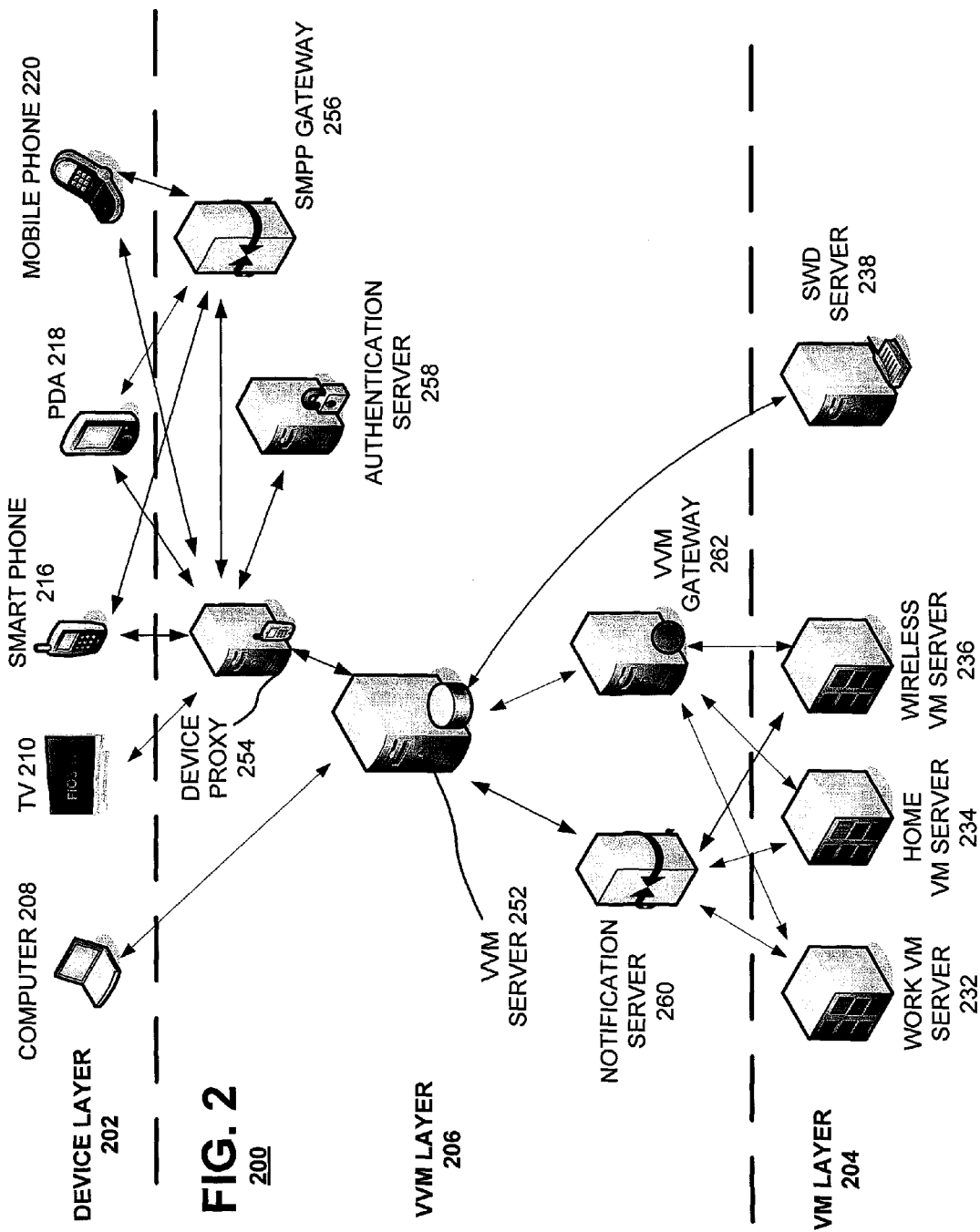

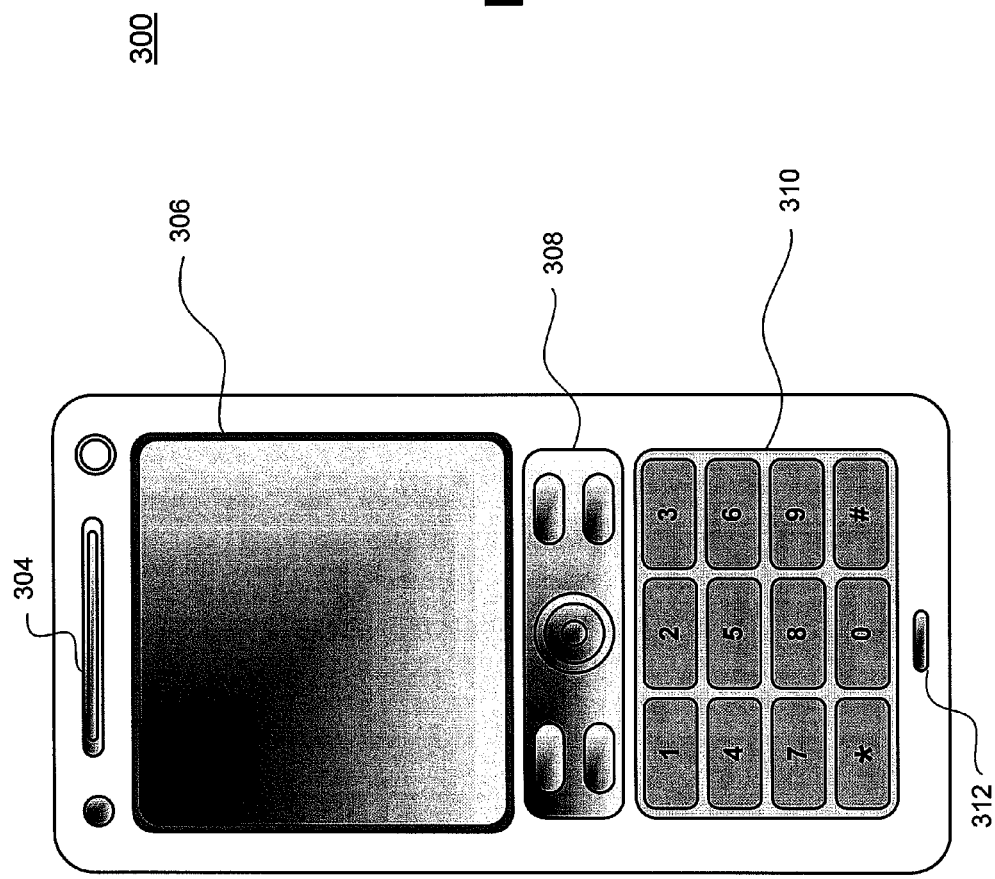

MESSAGE TABLE 600-1

| MAILBOX ID 602 | MESSAGE ID 604 | CALLED DN 605 | CALLER DN 606 | STATE 610 | LOCATION 612 |
|---|---|---|---|---|---|
| MBA1 | A124 | 7035678989 | 2025361234 | HEARD | MSG8.QCP |

652

MESSAGE TABLE 600-2

| MAILBOX ID 602 | MESSAGE ID 604 | CALLED DN 605 | CALLER DN 606 | STATE 610 | LOCATION 612 |
|---|---|---|---|---|---|
| MBB1 | B156 | 2023459292 | 9186321642 | SAVED | MSG2.QCP |

656

MESSAGE TABLE 600-3

| MAILBOX ID 602 | MESSAGE ID 604 | CALLED DN 605 | CALLER DN 606 | STATE 610 | LOCATION 612 |
|---|---|---|---|---|---|
| MBC1 | C129 | 2022513434 | 2018675309 | HEARD | MSG1.QCP |

MESSAGE TABLE 600-1'

| MAILBOX ID 602 | MESSAGE ID 604 | CALLED DN 605 | CALLER DN 606 | STATE 610 | LOCATION 612 |
|---|---|---|---|---|---|
| MBA1 | A124 | 7035678989 | 2025361234 | HEARD | MSG8.QCP |
| MBA1 | A125 | 7035678989 | 2039574986 | NEW | MSG9.QCP |

MESSAGE TABLE 600-2'

| MAILBOX ID 602 | MESSAGE ID 604 | CALLED DN 605 | CALLER DN 606 | STATE 610 | LOCATION 612 |
|---|---|---|---|---|---|
| MBB1 | B156 | 2023459292 | 9186321642 | SAVED | MSG2.QCP |
| MBB1 | B157 | 2023459292 | 3016651233 | NEW | MSG3.QCP |

MESSAGE TABLE 600-3'

| MAILBOX ID 602 | MESSAGE ID 604 | CALLED DN 605 | CALLER DN 606 | STATE 610 | LOCATION 612 |
|---|---|---|---|---|---|
| MBC1 | C129 | 2022513434 | 2018675309 | HEARD | MSG1.QCP |
| MBC1 | C130 | 2022513434 | 4569812124 | NEW | MSG4.QCP |

FIG. 6B

AGGREGATE MESSAGE TABLE 700

| MAILBOX ID 702 | MESSAGE ID 704 | CALLED DN 705 | CALLER DN 706 | STATE 710 | LOCATION 712 |
|---|---|---|---|---|---|
| MBA1 | A124 | 7035678989 | 2025361234 | HEARD | MSG8.QCP |
| MBC1 | C129 | 2022513434 | 2018675309 | HEARD | MSG1.QCP |
| MBB1 | B156 | 2023459292 | 9186321642 | SAVED | MSG2.QCP |

752 — (MBA1 row)
754 — (MBC1 row)
756 — (MBB1 row)

FIG. 7A

AGGREGATE MESSAGE TABLE 700'

| MAILBOX ID 702 | MESSAGE ID 704 | CALLED NO. 705 | CALLER NO. 706 | STATE 710 | LOCATION 712 |
|---|---|---|---|---|---|
| MBA1 | A124 | 7035678989 | 2025361234 | HEARD | MSG8.QCP |
| MBC1 | C129 | 2022513434 | 2018675309 | HEARD | MSG1.QCP |
| MBB1 | B156 | 2023459292 | 9186321642 | SAVED | MSG2.QCP |
| MBB1 | B157 | 2023459292 | 3016651233 | NEW | MSG3.QCP |
| MBC1 | C130 | 2022513434 | 4569812124 | NEW | MSG4.QCP |
| MBA1 | A125 | 7035678989 | 2039574986 | NEW | MSG9.QCP |

| NOTIFICATION TABLE 800 ||
|---|---|
| MAILBOX ID 802 | NOTIFICATION DN 804 |
| MBA1 | 2022513434<br>2023459292<br>7035678989 |
| MBB1 | 7035678989<br>2022513434<br>2023459292 |
| MBC1 | 7035678989<br>2023459292<br>2022513434 |

MANAGING VISUAL VOICEMAIL FROM MULTIPLE DEVICES

RELATED APPLICATIONS

This application is a continuation of U.S. patent application Ser. No. 12/236,808 filed Sep. 24, 2008, which claims the benefit of (1) U.S. Patent Application No. 61/013,549 filed Dec. 13, 2007, and (2) provisional U.S. Patent Application No. 61/018,044, filed Dec. 31, 2007, the disclosures of these two applications being incorporated herein by reference.

BACKGROUND INFORMATION

Visual voicemail is a user friendly application that adds a visual aspect to managing voicemail messages. Visual voicemail may enable mobile phone users to manage voicemail message in an order of their choice, e.g., in a random order rather than a sequential order.

BRIEF DESCRIPTION OF THE DRAWINGS

FIG. 1A is a block diagram of an exemplary environment in which embodiments disclosed herein may be implemented;

FIGS. 1B, 1C, and 1D show exemplary visual voicemail graphical user interfaces;

FIG. 2 is a block diagram of an exemplary network in which embodiments described herein may be implemented;

FIG. 3 is a block diagram of an exemplary user device;

FIGS. 6A and 6B are diagrams of exemplary message tables;

FIGS. 7A and 7B are block diagrams of exemplary aggregate message tables;

FIG. 8 is a block diagram of an exemplary notification table;

DETAILED DESCRIPTION OF PREFERRED EMBODIMENTS

Figure 4:
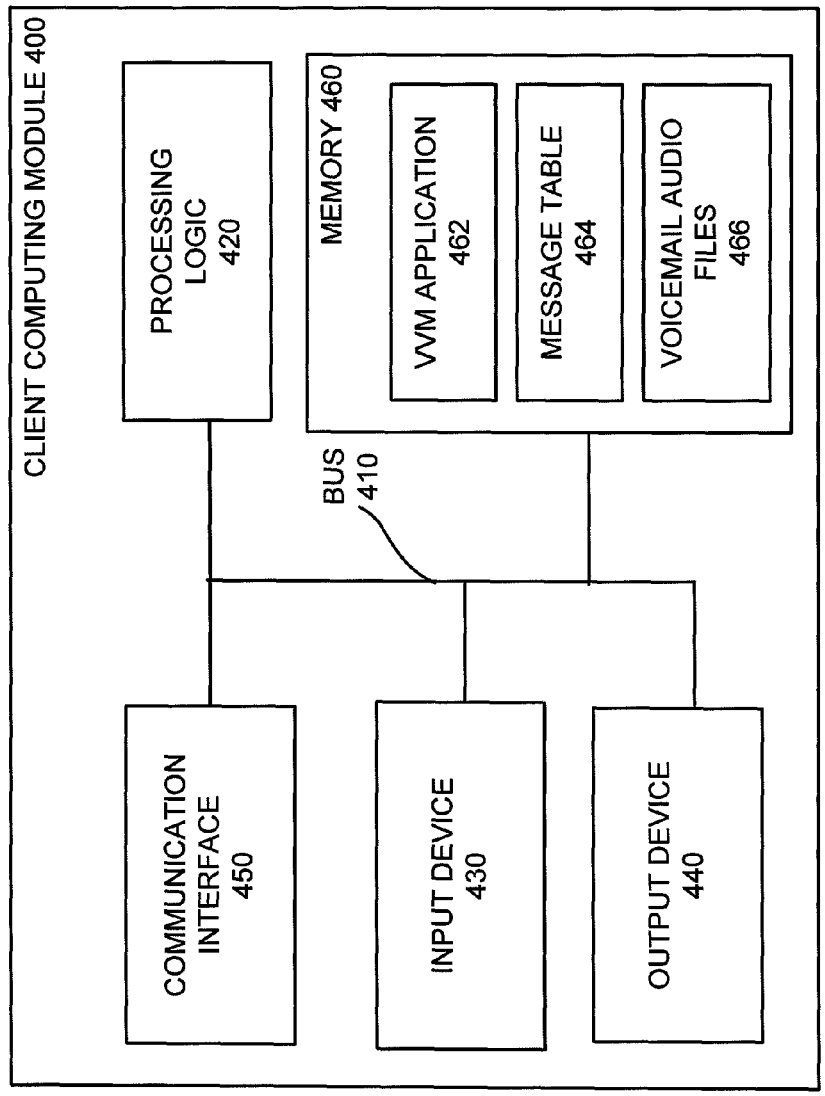
FIG. 4 is a block diagram of exemplary components of a client computer module.

The following detailed description refers to the accompanying drawings. The same reference numbers in different drawings may identify the same or similar elements. Also, the following detailed description does not limit the invention.

A person may have multiple communication devices, such as a home phone, a mobile phone, a smart phone, a personal digital assistant (PDA), a computer, etc. Each of these devices may be associated with a mailbox for receiving voicemail messages. One or more embodiments disclosed herein may allow for the management of any one of these mailboxes from each of the communication devices. For example, FIG. 1A is a block diagram of an exemplary environment 100 in which embodiments disclosed herein may be implemented. Environment 100 includes a work phone 101, a home phone 102, a mobile phone 103, and a work voicemail (VM) server 104. In this example, work VM server 104 may store voicemail messages in a mailbox for unanswered calls to work phone 101. In embodiments disclosed herein, a user may manage the voicemail mailbox in the work VM server from the user's work phone 101, as usual, but may also manage the mailbox from home phone 102 and mobile phone 103. In one embodiment, actions taken by the user on voicemail messages using one device (e.g., mobile phone 103) may be reflected on all of the user's devices (e.g., work phone 101, home phone 102, and mobile phone 103). For example, if the user deletes a voicemail message in work VM server 104 using mobile phone 103, this change may be reflected in work phone 101 and home phone 102, as well as mobile phone 103.

FIGS. 1B, 1C, and 1D show exemplary visual voicemail (VVM) graphical user interfaces (GUIs) for a communication device, such a portable communication device (e.g., a mobile phone). FIG. 1B shows an exemplary pop-up screen for notifying a user that there are three new voicemail messages waiting in the user's voicemail box. FIG. 1B also shows that the user may select to ignore the voicemail messages (e.g., using a button 105) or listen to the voicemail messages (e.g., using a button 106). If the user selects to listen to the voicemail messages, the user may be presented with the GUI shown in FIG. 1C, for example.

FIG. 1C shows an exemplary list of voicemail messages including, for each voicemail, the name of the caller, the phone number of the caller, the time of the call, and the length of the voicemail message. In addition, the GUI of FIG. 1C may present an icon for each voicemail message indicating the mailbox in which the voicemail was left or deposited. For example, a building icon 108 may indicate that a message was left in the user's work mailbox; a house icon 110 may indicate that a message was left in the user's home mailbox; and a mobile-phone icon 112 may indicate that a message was left in the user's mobile-phone mailbox.

The exemplary GUIs of the communication device may allow a user to manage the selected voicemail message. In the exemplary GUI of FIG. 1C, the user may scroll to and select any of the listed voicemail messages in any order. For example, a voicemail message 120 (in the user's mobile-phone mailbox) from Bob Sherman is highlighted for selection. The user may delete the selected voicemail message (e.g., using a button 114) or play the selected voicemail message (e.g., using a button 116). If the user selects to play the voicemail, the user may be presented with the GUI shown in FIG. 1D, for example.

FIG. 1D shows an exemplary voicemail message being played. As shown in FIG. 1D, the user may delete the selected message (e.g., using a button 122 or a key labeled "7" on a numeric keypad); may save the message (e.g., using a button 124 or a key labeled "9" on the numeric keypad); may initiate a call to the party that left the voicemail message (e.g., using a button 126 or a key labeled "5" on the numeric keypad); may rewind the message (e.g., using a button 128); may fast-forward the message (e.g., using a button 130); or may pause the message (e.g., using a button 132). In one embodiment, management actions taken on a message using one communication device may be reflected on one or more other communication devices that may manage the same mailbox.

FIG. 2 shows an exemplary network 200 in which embodiments described herein may be implemented. As shown, network 200 may include a device layer 202, a voice-mail (VM) layer 204, and a VVM layer 206. VVM layer 206 may lie between device layer 202 and VM layer 204 and may facilitate the exchange of messages (e.g., communications) between device layer 202 and VM layer 204.

Device layer 202 may include, for example, a computer 208, a television (TV) 210, a smart phone 216 (e.g., a Blackberry, Treo, etc.), a PDA 218, a mobile phone 220, and/or another type of communication device. Any of devices 208-220 may be considered user devices. VM layer 204 may include VM servers 232-236 (e.g., a work VM server 232, a home VM server 234, and a wireless VM server 236), and a service-wide directory (SWD) server 238. VVM layer 206 may include a VVM server 252, a device proxy 254, an SMPP (Short Message Peer-to-Peer Protocol) gateway server 256, an authentication server 258, a notification server 260, and a VVM gateway server 262.

Computer 208 may include one or more computer systems for hosting programs, databases, and/or applications. Computer 208 may include a laptop, desktop, or any other type of computing device. Computer 208 may include a browser application program for navigating a network, such as the Internet.

TV 210 may include a device capable of receiving and reproducing video and audio signals, e.g., a video display device. TV 210 may include a liquid crystal display (LCD), a cathode ray tube (CRT), a plasma display, etc.

TV 210 may be associated with a set-top box (STB) (not shown). The STB may include a computer device, such as a cable card, for hosting programs, databases, and/or applications. In one embodiment, TV 210 may include the STB in the same housing. TV 210 and/or the STB may include a visual voicemail application to receive, listen to, and/or send voicemail messages. TV 210 and/or the STB may be associated with a remote control (not shown). The remote control may include control keys to navigate menus displayed on TV 210, for example, and to otherwise control functions of TV 210 and/or the STB. The remote control may transmit infrared signals, or another type of signals, to an input device associated with the STB and/or TV 210.

Smart phone 216, PDA 218, and/or mobile phone 220 may allow a user to place telephone calls to other user devices. Smart phone 216, PDA 218, and/or mobile phone 220 may communicate with other devices via one or more communication towers (not shown) using a wireless communication protocol, e.g., GSM (Global System for Mobile Communications), CDMA (Code-Division Multiple Access), WCDMA (Wideband CDMA), GPRS (General Packet Radio Service), EDGE (Enhanced Data Rates for GSM Evolution), etc. In one embodiment, smart phone 216, mobile phone 220, and/or PDA 218 may communicate with other devices through a wireless local network using WiFi (e.g., IEEE 802.11x).

In other embodiments, smart phone 216, PDA 218, and/or mobile phone 220 may also communicate with other devices via a wired network. For example, smart phone 216, mobile phone 220, and PDA 218 may communicate with other devices using a public-switched telephone network (PSTN) or the Ethernet protocol. Smart phone 216, PDA 218, and mobile phone 220 may include a visual voicemail application to receive, listen to, and/or send voicemail messages.

Work VM server 232, home VM server 234, and wireless VM server 236 may each receive and store voicemail messages in mailboxes associated with one or more user devices, such as user devices 208-220. Examples of VM servers include the Lucent Automatic Call Distributor (ACD) server and the Comverse Voicemail Service Node (VSN) server. VM servers 232-236 may receive voicemail messages when, for example, a user does not answer a call request. VM servers 232-236 may deliver the voicemail messages when requested, for example, to one of user devices 208-220 or VVM server 252. In one embodiment, VM servers 232-236 may store video voicemail, as well as audio voicemail. In one embodiment, VVM server may aggregate voicemail information from work VM server 232, home VM server 234, and/or wireless VM server 236.

In one exemplary embodiment, user devices 208-220 may be associated with a single user. For example, a user may have been issued smart phone 216 and computer 208 (which may include a soft phone) by an employer to be used for work. The same user may own mobile phone 220 for personal use and may have TV 210 at home for family use. The same user may also own PDA 218 that may be used as a personal address book as well as a home phone. In this exemplary embodiment, work VM server 232 may receive and store voicemail for smart phone 216; home VM server 234 may receive and store voicemail for PDA 218; and wireless VM server 236 may receive and store voicemail for mobile phone 220. Although user devices 208-220 may be associated with one user in this example, VM servers 232-236 may store voicemails for more than one user (e.g., thousands or hundreds of thousands of users).

VM servers 232-236 may notify VVM server 252 of new voicemail messages by sending messages (e.g., SMPP messages) to VVM server 252 through notification server 260. VM servers 232-236 may also provide voicemail message information (e.g., voicemail message headers) to VVM server 252 by sending messages (e.g., IMAP (Internet Message Mapping Protocol) messages) to VVM server 252 through VVM gateway 262. VM servers 232-236 may also send voicemail message audio files to devices 208-220 through VVM gateway 262, VVM server 252 and/or device proxy 254, for example.

SWD server 238 may include a database of device numbers (e.g., phone numbers, mobile device numbers, Universal Resource Indicators (URIs), or Universal Resource Locaters (URLs)) and corresponding mailbox identifiers (mailbox IDs) associated with each of the device numbers. A mailbox ID may identify the mailbox used for storing voicemail messages for a corresponding device number. A mailbox ID may also identify the VM server (e.g., one of VM servers 232-236) with which the mailbox is associated. SWD 238 may also store information for associating multiple user devices, device numbers, or mailbox IDs with a single user, such as associating user devices 208-220 with the same user.

VVM server 252 may include one or more computer systems for hosting programs, databases, and/or applications. VVM server 252 may run a web server application, such as Apache, to serve web pages when requested. For example, VVM server 252 may allow a user to access voicemail message over the a data network, for example, using computer 208. VVM server 252 may request voicemail messages and/or headers from one of VM servers 232-236 and may forward voicemail messages and/or headers to any one of devices 208-220 directly or through VVM gateway 262, device proxy 254, and/or SMPP gateway 256.

Notification server 260 may receive voicemail message notifications (e.g., SMPP messages) from VM servers 232-236. Notification server 260 may pass notifications of voicemail messages received from VM servers 232-236 to VVM server 252 (e.g., as HTTP messages).

VVM gateway 262 may receive information about voicemail messages (e.g., voicemail message headers) from VM servers 232-236. The information may include lists of voicemail messages that may include data conforming to, for example, the IMAP protocol. VVM gateway 262 may pass voicemail message headers received from VM servers 232-236 to VVM server 252. VVM gateway 262 may pass data to VVM server 252 in the form of XML (eXtensible Markup Language) data in HTTP messages, for example.

Device proxy 254 may receive communications from one or more user devices 210-220 for forwarding to other devices (e.g., VVM server 252 and/or SMPP gateway 256). Device proxy 254 may also authenticate user devices (e.g., user devices 210-220) by, for example, communicating with authentication server 258. Authentication server 258 may store information related to device authentication, such as session cookies. Device proxy 254 may communicate with devices (e.g., user devices 210-220) using secure channels implementing, for example, SSL (Secure Socket Layer) protocols or TLS (Transport Layer Security) protocols.

SMPP gateway 256 may receive SMPP (e.g., SMS (Short Message System)) messages from device proxy 254 and pass the received SMPP messages to user devices, such as user devices 216-220. SMPP gateway 256 may also receive SMPP messages from user devices 216-220, for example, and pass the received SMPP messages to device proxy 254.

In other embodiments, network 200 may include more, fewer, or different devices. Moreover, one or more devices 208-262 may perform one or more functions of any other device in network 200. Furthermore, one or more of devices 208-262 may be remotely located from each other, e.g., devices 208-262 may be geographically diverse. Although FIG. 2 shows devices 208-262 coupled to each other in a particular configuration, devices 208-262 may also be arranged in other configurations, either coupling directly with each other or through one or more networks, such that any one of devices 208-262 may communicate with any other one of devices 208-262. For example, any one of devices 208-262 may communicate with any other one of devices 208-262 through the Internet, an ad hoc network, a local area network (LAN), a wide area network (WAN), a metropolitan area network (MAN), a cellular network, a PSTN, a high-speed fiber optic network (e.g., FiOS™), or any other network or combinations of networks.

FIG. 3 is diagram of an exemplary user device 300, such as one or more of user devices 208-220. As illustrated, user device 300 may include a speaker 304, a display 306, control keys 308, a keypad 310, and a microphone 312. User device 300 may include other components (not shown in FIG. 3) that aid in receiving, transmitting, and/or processing data. Moreover, other configurations of user device 300 are possible.

Speaker 304 may provide audible information to a user of user device 300. Display 306 may include a display screen to provide visual information to the user, such as video images or pictures, and may include a touch-screen display to accept inputs from the user. For example, display 306 may provide information regarding incoming or outgoing telephone calls, telephone numbers, contact information, current time, voicemail, email, etc. Display 306 may display the GUIs shown in FIGS. 1B-1D, for example.

Control keys 308 may permit the user to interact with user device 300 to cause user device 300 to perform one or more operations, such as interacting with a visual voicemail application. Control keys 308 may include soft keys that may perform the functions indicated on display 306 directly above the keys. Keypad 310 may include a standard telephone keypad and may include additional keys to enable inputting (e.g., typing) information into user device 300. Microphone 312 may receive audible information from the user.

FIG. 4 is a block diagram of exemplary components of a client computing module 400. User devices 208-220 may each include one or more computing modules 400. Client computing module 400 may include a bus 410, processing logic 420, an input device 430, an output device 440, a communication interface 450, and a memory 460. Client computing module 400 may include other components (not shown) that aid in receiving, transmitting, and/or processing data. Moreover, other configurations of components in client computing module 400 are possible.

Bus 410 may include a path that permits communication among the components of client computing module 400. Processing logic 420 may include any type of processor or microprocessor (or groups of processors or microprocessors) that interprets and executes instructions. In other embodiments, processing logic 420 may include an application-specific integrated circuit (ASIC), a field-programmable gate array (FPGA), or the like.

Input device 430 may include a device that permits a user to input information into client computing module 400, such as a keyboard (e.g., control keys 308 and/or keypad 310), a mouse, a pen, a microphone (e.g., microphone 312), a remote control, a touch-screen display (e.g., display 306), etc. Input device 430 may include an accelerometer that may allow client computing module to measure acceleration and movement of the device that includes the client computing module. Output device 440 may include a device that outputs information to the user, such as a display (e.g., display 306), a printer, a speaker (e.g., speaker 304), etc. Output device 440 may also include a vibrator to alert a user.

Input device 430 and output device 440 may allow the user to activate a particular service or application, such as a visual voicemail application and/or service. Input device 430 and output device 440 may allow the user to receive and view a menu of options and select from the menu options. The menu may allow the user to select various functions or services associated with applications executed by client computing module 400.

Communication interface 450 may include any transceiver-like mechanism that enables client computing module 400 to communicate with other devices and/or systems. Communication interface 450 may include a transmitter that may convert baseband signals to radio frequency (RF) signals and/or a receiver that may convert RF signals to baseband signals. Alternatively, communication interface 450 may include a transceiver to perform functions of both a transmitter and a receiver. Communication interface 450 may be coupled to an antenna for transmission and reception of the RF signals. Communications interface 450 may include a network interface card, e.g., Ethernet card, for wired communications or a wireless network interface (e.g., a WiFi) card for wireless communications. Communication interface 450 may also include, for example, a universal serial bus (USB) port for communications over a cable, a Bluetooth™ wireless interface for communicating with Bluetooth devices, a near-field communication (NFC) interface, etc. Communication interface 450 may implement a wireless communication protocol, e.g., GSM, CDMA, WCDMA, GPRS, EDGE, etc. Communications interface 450 may also receive, transmit and/or process digital or analog audio inputs/outputs and/or digital or analog video inputs/outputs.

Memory 460 may include a random access memory (RAM) or another type of dynamic storage device that may store information and instructions, e.g., an application, for execution by processing logic 420; a read-only memory (ROM) device or another type of static storage device that may store static information and instructions for use by processing logic 420; and/or some other type of magnetic or optical recording medium and its corresponding drive, e.g., a hard disk drive (HDD), for storing information and/or instructions.

Memory 460 may include a VVM application 462, a voicemail message table 464 (e.g., database), and voicemail audio files 466. VVM application 462 may allow a user to receive, select, listen to, and act on (e.g., save, forward, delete) voicemail messages. Message table 464 may store a list of voicemail messages including information such as the date and time of a voicemail message, the duration of the message, the status of the message, etc. Voicemail audio files 466 may include the audio data of the voicemails (e.g., in any format, including MP3, WMA (Windows Media Audio), AAC (Advanced Audio Coding), QCP (Qualcomm Code Prediction and/or Qualcomm Code Excited Linear Prediction), Ogg Vorbis, etc.).

Client computing module 400 may perform certain operations, as described below. Client computing module 400 may perform these operations in response to processing logic 420 executing software instructions contained in a computer-readable medium, such as memory 460. A computer-readable medium may be defined as a physical or logical memory device. The software instructions may be read into memory 460 from another computer-readable medium or from another device via communication interface 450. The software instructions contained in memory 460 may cause processing logic 420 to perform processes that are described below.

Figure 5:
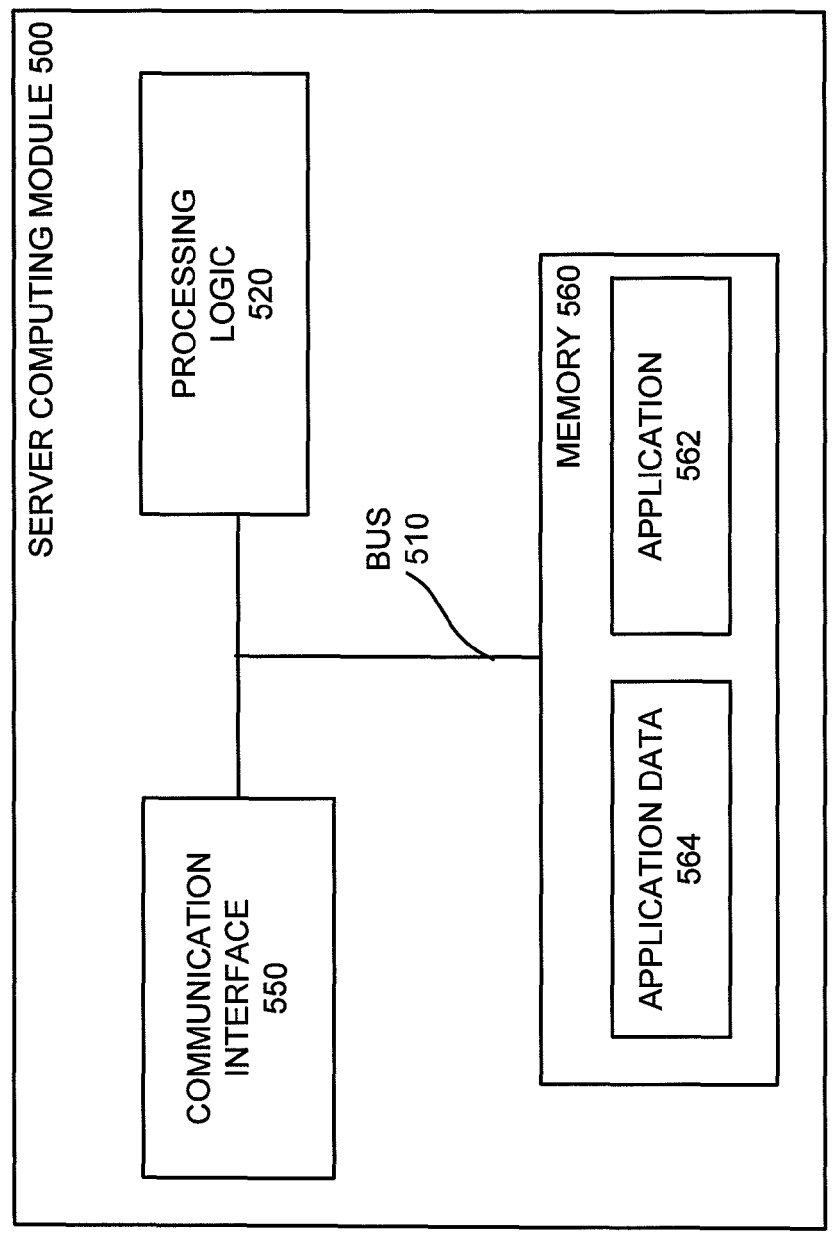
FIG. 5 is a block diagram of exemplary components of a server computing module.

FIG. 5 is a block diagram of exemplary components of a server computing module 500. Devices 232-262 may include one or more server computing modules (e.g., a rack of server computer modules), such as computing module 500. Server computing module 500 may include a bus 510, processing logic 520, a communication interface 550, and a memory 560. Server computing module 500 may include other components (not shown) that aid in receiving, transmitting, and/or processing data. Moreover, other configurations of components in module 500 are possible.

Bus 510 may include a path that permits communication among the components of module 500. Processing logic 520 may include any type of processor or microprocessor (or groups of processors or microprocessors) that interprets and executes instructions. In other embodiments, processing logic 520 may include an ASIC, an FPGA, or the like.

Communication interface 550 may include any transceiver-like mechanism that enables module 500 to communicate with other devices and/or systems. Communication interface 550 may include a transmitter that may convert baseband signals from processing logic 520 to RF signals and/or a receiver that may convert RF signals to baseband signals. Alternatively, communication interface 550 may include a transceiver to perform functions of both a transmitter and a receiver. Communication interface 550 may be coupled to an antenna for transmission and reception of the RF signals. Communications interface 550 may include a network interface card, e.g., Ethernet card, for wired communications or a wireless network interface (e.g., a WiFi card) for wireless communications. Communication interface 550 may also include, for example, a USB port for communications over a cable, a Bluetooth wireless interface for communicating with Bluetooth devices, a NFC interface, etc. Communication interface 550 may implement a wireless communication protocol, e.g., GSM, CDMA, WCDMA, GPRS, EDGE, etc. Communications interface 550 may receive, transmit and/or process digital or analog audio inputs/outputs and/or digital or analog video inputs/outputs.

Memory 560 may include a RAM or another type of dynamic storage device that may store information and instructions, e.g., an application 562 and application data 564, for execution by processing logic 520; a ROM device or another type of static storage device that may store static information and instructions for use by processing logic 520; and/or some other type of magnetic or optical recording medium and its corresponding drive, e.g., a HDD, for storing information and/or instructions.

In the case of VM servers 232-236, for example, application 562 may include an application to receive voicemail messages on behalf of user devices, such as user devices 216-220, when the users of the devices do not answer call requests, for example. Application data 564 may include voicemail message tables and corresponding audio data.

In the case of VVM server 252, for example, application 562 may include an application to receive voicemail message information and corresponding voicemail audio data from VM servers 232-236 and deliver the received voicemail message information and corresponding voicemail audio data to user devices. As such, in the case of VVM server 252, application data 564 may also include voicemail message tables and corresponding audio files.

Module 500 may perform certain operations, as described in detail below. Module 500 may perform these operations in response to processing logic 520 executing software instructions contained in a computer-readable medium, such as memory 560. The software instructions may be read into memory 560 from another computer-readable medium or from another device via communication interface 550. The software instructions contained in memory 560 may cause processing logic 520 to perform processes that are described below.

FIG. 6A is a diagram of exemplary message tables 600-1, 600-2, and 600-3, e.g., databases (collectively "message tables 600"). Message tables 600 may each store information related to voicemail messages. Each entry (e.g., record) in message tables 600 may include information regarding a different voicemail message.

Message tables 600 may be stored in one or more of VM servers 232-236 (e.g., in memory 560). In one exemplary embodiment, message table 600-1 may store information regarding messages associated with smart phone 216; message table 600-2 may store information regarding messages associated with PDA 218; and message table 600-3 may store information regarding messages associated with mobile phone 220. In this exemplary embodiment, message table 600-1 may be stored in work VM server 232; message table 600-2 may be stored in home VM server 234; and message table 600-3 may be stored in wireless VM server 236. In other embodiments, message tables 600 may also be stored in another device in network 200, such as in VVM server 252 (e.g., in memory 560) or any of devices 208-220 (e.g., in memory 460 as message table 464).

Message tables 600 may include a mailbox identifier ("mailbox ID" or "MBID") field 602, a message identifier ("message ID" or "MID") field 604, a called device number (DN) field 605, a caller DN field 606, a state field 610, and a location field 612.

Mailbox ID field 602 may include a value identifying a mailbox in one of VM servers 232-236. In exemplary message tables 600, there are three mailboxes identified in mailbox ID field 602: MBA1, MBB1, and MBC1. In this example, MBA1 may be a mailbox in work VM server 232 associated with smart phone 216, MBB1 may be a mailbox in home VM server 234 associated with PDA 218 and, and MBC1 may be a mailbox in wireless VM server 236 associated with mobile phone 220.

Message ID field 604 may include a value that may uniquely identify a voicemail message in a mailbox. For example, record 652 in message table 600-1 stores a message identifier of A124 in message ID field 604.

Called DN field 605 may include a device number (e.g., phone number, mobile device number, URI, or URL) of the user device for which the corresponding voicemail message is intended. In exemplary message tables 600, there are three device numbers in called DN field 605: 2022513434, 7035678989, and 2023459292. In this example, the device number 2022513434 may be associated with mobile phone 220; the device number 2023459292 may be associated with PDA 218; and the device number 7035678989 may be associated with smart phone 216. In one embodiment, there may be a one-to-one relationship between a called DN and a mailbox ID, such that each called DN is associated with one mailbox ID and vice versa.

Caller DN field 606 may include a device number (e.g., phone number, mobile device number, URI, or URL) of the user device associated with the depositing of the corresponding voicemail message. In exemplary message tables 600, the messages identified in records 652-656 were deposited by various different device numbers as indicated in field 606.

State field 610 may include one or more tags identifying the state (e.g., status) of the corresponding voicemail message. Tags in state field 610 may include NEW, HEARD, SAVED, and DELETED. The NEW tag may indicate a voicemail message that has not been listened to yet by the user. The HEARD tag may indicate a voicemail message that has been listened to by the user. The SAVED tag may indicate a voicemail message that the user requested be saved in one of user devices 208-220 and/or one of VM servers 232-236 for a number of days, e.g., 21 days. The DELETED tag may indicate a voicemail message that has been marked for deletion by, for example, a user device. Other tags in state field 610 are possible, such as BUSINESS to identify business voicemail message, PERSONAL to identify personal voicemail message, FAMILY to identify voicemail message from family members, URGENT to identify urgent messages, and NOT URGENT to identify non-urgent messages.

Location field 612 may indicate the location (e.g., filename and/or pathname, URL, or URI) of an audio file associated with the corresponding voicemail message. In one embodiment, the audio file may be stored locally and location field 612 may include the filename of the local file associated with the corresponding voicemail message. In another embodiment, the audio file may be stored remotely and location field 612 may include the remote location of the audio file associated with the corresponding voicemail message.

Message tables 600 may include additional, different, or fewer fields than illustrated in FIG. 6A. For example, message tables 600 may include a call time field that may include the date and time that the corresponding voicemail message was left in one of VM servers 232-236. As another example, message tables 600 may include a priority field that may specify the urgency (e.g., 1-10) of the corresponding voicemail message.

FIG. 6B is a block diagram of exemplary message tables 600-1', 600-2', and 600-3' (collectively message tables 600'). Message tables 600-1', 600-2', and 600-3' may represent message tables 600-1, 600-2, and 600-3, respectively, but at a different point in time. Message tables 600' may be referred to as "updated message tables 600'." Like exemplary message tables 600, exemplary message tables 600' include records 652, 654, and 656. Unlike message tables 600, however, message tables 600' include records 658, 660, and 662. In particular, message table 600-1' includes record 662 that does not appear in message table 600-1; message table 600-2' includes record 658 that does not appear in message table 600-2; and message table 600-3' includes record 660 that does not appear in message table 600-3. As shown in exemplary message tables 600', records 658, 660, and 662 each include a state of NEW in state field 610.

The data in message tables 600 and 600' are for exemplary purposes only. As shown, for example, message tables 600-1 and 600-1' store information for only one mailbox ID and one called DN (e.g., mailbox ID of MBA1 and called DN of 7035678989). Message tables 600-1 and 600-1' (and the other message tables) may store information for more than one mailbox ID and called DN, however. In addition, message tables 600 and 600' may store thousands or hundreds of thousands of records.

FIG. 7A is a block diagram of an exemplary aggregate message table 700, e.g., a database. Aggregate message table 700 may store information from one or more other message tables, such as message tables 600. Aggregate message table 700 may be stored in one or more of devices 208-220 (e.g., in memory 460 as message table 464). Aggregate message table 700 may also be stored in VVM server 252 (e.g., in memory 560) or another device in network 200.

Like message tables 600, each entry in aggregate message table 700 may include information regarding a different voicemail message. Further, aggregate message table 700 may include the same or similar fields as message tables 600. That is, aggregate message table 700 may include a mailbox ID field 702, a message ID field 704, a called DN field 705, a caller DN field 706, a state field 710, and a location field 712. Aggregate message table 700 may include additional, different, or fewer fields than illustrated in FIG. 7. These fields shown in FIG. 7 may store the same or similar information as descried above for fields 602-612 in FIG. 6A of message tables 600 or 600'.

Exemplary aggregate message table 700 may include records 752, 754, and 756, which may store the same information as records 652, 654, and 656, respectively, in message tables 600. Thus, aggregate message table 700 may be considered an "aggregate" table because it aggregates message information from a group of disparate message tables corresponding to different mailboxes, in this case message tables 600. In an alternative embodiment, message table 700 may store data from only one other message table.

FIG. 7B is a block diagram of an exemplary aggregate message table 700', which may represent aggregate message table 700 at a different point in time. Aggregate message table 700' includes records 752, 754, and 756 that also appear in aggregate message table 700. Aggregate message table 700' also includes records 758, 760, and 762 that do not appear in aggregate message table 700. Exemplary aggregate message table 700' may include records 758, 760, and 762, which may store the same information as records 658, 660, and 662, respectively, in message tables 600'. As shown, records 758, 760, and 762 each include a state of NEW in state field 710.

The data in aggregate message tables 700 and 700' are for exemplary purposes. Aggregate message tables 700 and 700' as shown, for example, store information for voicemail messages associated with a single user, e.g., the user related to smart phone 216, PDA 218, and mobile phone 220. Aggregate message tables 700 and 700' may store information associated with thousands even hundreds of thousands of users. In addition, aggregate message tables 700 and 700' may store thousands or hundreds of thousands of messages, for example.

FIG. 8 is a block diagram of an exemplary notification table 800. Notification table 800 may store information identifying the user device(s) that are to receive a notification when, for example, a voicemail message is received for a particular mailbox. Notification table 800 may be stored in SWD server 238 (e.g., in memory 560). Alternatively or additionally, notification table 800 may be stored in VVM server 252 or in another device in network 200. In one embodiment, a user may edit and update information stored in notification table 800 using, for example, a browser in computer 208.

Notification table 800 may include a mailbox ID field 602 and a notification DN field 804. Notification table 800 may include additional, different, or fewer fields than illustrated in FIG. 8.

Mailbox ID field 802 may include a value identifying a mailbox in one of the VM servers, such as one of VM servers 232-236. In exemplary notification table 800, there are three mailboxes identified in mailbox ID field 602: MBA1, MBB1, and MBC1. These three mailboxes correspond to the mailboxes stored in message tables 600 and aggregate message table 700, for example.

Notification DN field 804 may include the device number(s) (e.g., phone number, mobile device number, URI, or URL) of the user device(s) associated with the corresponding mailbox in mailbox ID field 802 for receiving voicemail message information notifications. As indicated in notification table 800, fields 802 and 804, when mailbox MBC1 receives a new voicemail, for example, then the user device associated with device numbers 2022513434, 7035678989, and 2023459292 (e.g., mobile phone 220, smart phone 216, and PDA 218, respectively) may be notified.

As indicated above, notification table 800 may include additional, different, or fewer fields than illustrated in FIG. 8. For example, notification table 800 may include fields that indicate what type of notification messages (e.g., only new messages) should be sent to different devices and when they should be sent.

Figure 9A:
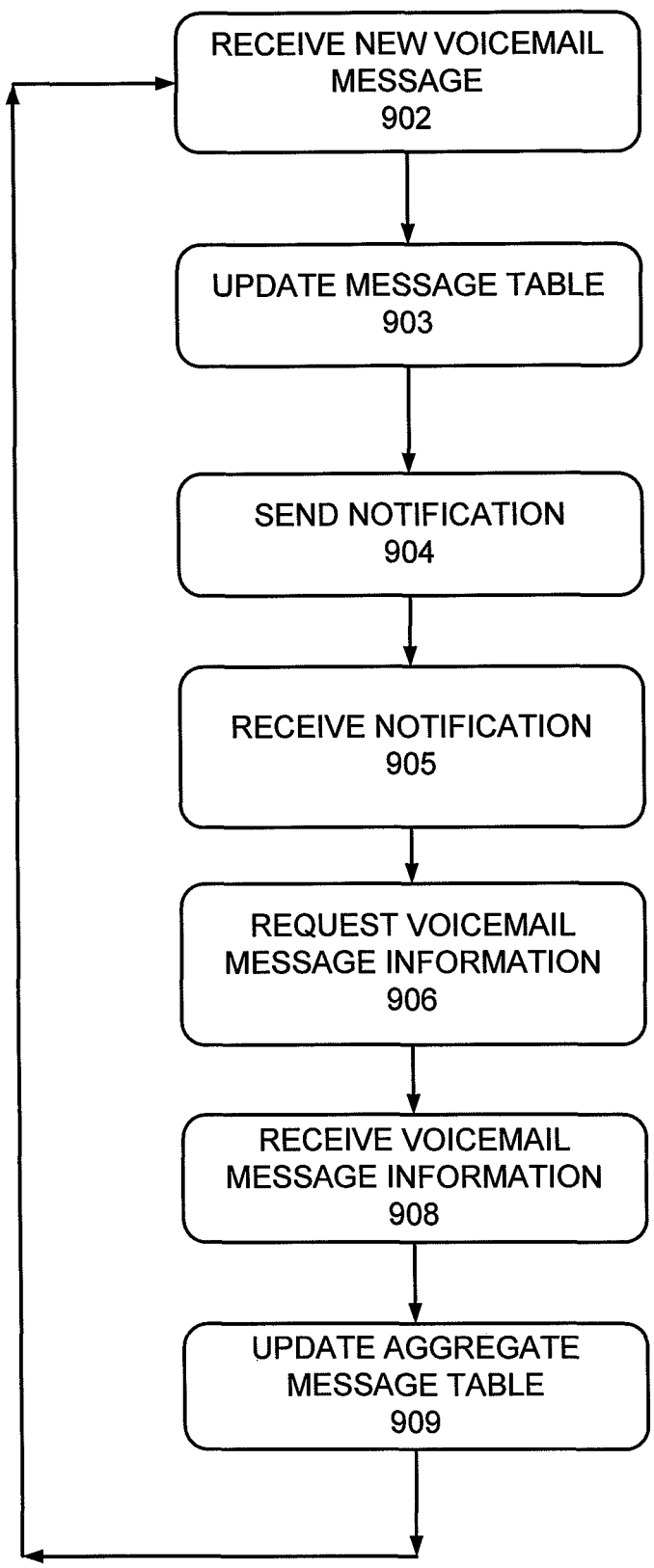
FIGS. 9A and 9B are flowcharts of exemplary processes for receiving a voicemail and notifying a user device of voicemail information.

FIG. 9A is a flowchart of an exemplary process 900A for receiving a voicemail message and for notifying a VVM server of voicemail information. FIG. 9A is described with respect to FIG. 10, which is a diagram of exemplary network signals for notifying a user device of voicemail information. For the purposes of FIG. 10, device proxy 254, SMPP gateway 256, notification server 260, and VVM gateway 262 have been omitted for simplicity. All or parts of process 900A may run in work VM server 232, home VM server 234, wireless VM server 236, VVM server 252, and/or any of user devices 208-220.

Process 900A may begin when a new voicemail message is received (block 902). For example, mobile phone 220 (e.g., device number 2022513434) may receive a call request from another device (e.g., device number 4569812124). Mobile phone 220, however, may not accept (e.g., not answer) the call request, which may cause the call request to be directed to wireless VM server 236, and wireless VM server 236 may receive a voicemail message. A message table may be updated (block 903). Wireless VM server 236 may associate the received voicemail message with a message ID (e.g., a message ID of C130), the called DN (e.g., 2022513434), and the caller DN (e.g., 4569812124) and wireless VM server 236 may store this information in its message table, e.g., message table 600-3. In this example, wireless VM server 236 may update message table 600-3 to include record 660, as shown in message table 600-3'. Wireless VM server 236 may also store the mailbox ID (e.g., MBC1), the state (e.g., NEW), and the filename of the audio data (e.g., MSG4.QCP) in record 660.

Notification of voicemail message information may be sent (block 904). Having received a new voicemail (e.g., the voicemail message associated with record 660), wireless VM server 236 may send a notification (signal 1002) to VVM server 252 of the new voicemail. The notification message (signal 1002) may include the called DN, e.g., 2022513434 from field 605, and the mailbox ID, e.g., MBC1 from mailbox ID field 602. Wireless VM server 236 may send the notification (signal 1002) to VVM server 252 through notification server 260 (shown in FIG. 2), for example. In one embodiment, the notification message (signal 1002) may include an SMPP message. In one embodiment, the change of the message table in the VM server (e.g., the addition of record 660 to message table 600-3' in wireless VM server 236) may prompt the sending of the notification message (signal 1002). In this example, the notification of voicemail message information may be the result of a new voicemail message. Notifications may also be sent for other reasons, such as a state change in state field 610 of a voicemail message. In another embodiment, notification messages, such as signal 1002, may additionally or alternatively be sent on a periodic basis.

The notification of voicemail message information may be received (block 905). VVM server 252 may receive the notification (signal 1002) of voicemail message information. Voicemail message information may be requested (block 906). In response to signal 1002, VVM server 252 may send a request (signal 1004) for information regarding the voicemail messages stored by wireless VM server 236. VVM server 252 may send the request (signal 1004) to wireless VM server 236 through VVM gateway 262 (shown in FIG. 2), for example. The request (signal 1004) may include the called DN (e.g., of mobile phone 220 received earlier in signal 1002), the mailbox ID (e.g., MBC1 received earlier in signal 1002), and a personal identification number (PIN) associated with the mailbox ID. In one embodiment, if VVM server 252 does not store the PIN associated with the mailbox ID, then VVM server 252 may request the PIN from mobile phone 220.

Information regarding voicemail messages may be received (block 908). VVM server 252 may receive voicemail message information (signal 1006) from wireless VM server 236. Wireless VM server 236 may send voicemail message information (signal 1006) in response to receiving the request (signal 1004) for information regarding voicemail messages. Wireless VM server 236 may send the information (signal 1006) to VVM server 252 through VVM gateway 262 (shown in FIG. 2), for example. The voicemail message information (signal 1006) may include a list of voicemail messages. In one embodiment, the information may include XML formatted data including message IDs and the corresponding state (e.g., the information stored in state field 610).

In the current example where mobile phone 220 receives a voicemail message, the information in signal 1006 may include the message IDs of C129 and C130 from message ID field 604. The information in signal 1006 may also include the states associated with the two messages, e.g., NEW for the voicemail message associated with message ID C130 (record 660) and HEARD for the voicemail message associated with message ID C129 (record 654). In one embodiment, signal 1006 may include information related to only the records that prompted notification signal 1002 in the first place, e.g., the records that are new or have changed information.

VVM server 252 may update an aggregate message table (block 909). For example, before receiving the information (signal 1006) regarding voicemail messages, VVM server 252 may store an aggregate message table (similar to aggregate message table 700) which does not include a record corresponding to the information in record 660 of message table 600-3' of FIG. 6B. After receiving the information (signal 1006) regarding voicemail messages, VVM server 252 may update its aggregate message table to include the information in record 760 as shown in aggregate message table 700', which corresponds to record 660 of message table 600-3', e.g., the information of which was received in signal 1006.

In another embodiment, VVM server 252 may request voicemail message information (e.g., by sending signal 1004) on a periodic basis in addition to or alternatively to waiting for a notification (e.g., signal 1002). In this embodiment, VVM server 252 may periodically request voicemail message information from each VM server, such as VM servers 232-236.

Work VM server 232 and home VM server 234 may also implement portions of process 900A. For example, home VM server 234 may receive a voicemail message (block 902) for an unanswered call to PDA 218. Information regarding this voicemail may be stored (block 903) as record 658 in message table 600-2'. Home VM server 234 may send a notification signal (similar to signal 1002) to VVM server 252 (block 904). VVM server 252 may request (block 906) and receive (block 908) voicemail information from home VM server 234. VVM server 252 may update (block 909) its aggregate message table to include the information in record 758 (the information received from home VM server 234), as shown in exemplary aggregate message table 700'.

Work VM server 232 may also receive a voicemail message (block 902) for an unanswered call to smart phone 220. Information regarding this voicemail may be stored (block 903) as record 662 in message table 600-1'. Work VM server 232 may send a notification signal (similar to signal 1002) to VVM server 252 (block 904). VVM server 252 may request (block 906) and may receive (block 908) voicemail information from work VM server 232. VVM server 252 may update its aggregate voicemail message table to include the information in record 762 as shown in aggregate message table 700'.

As shown, in response to a voicemail message left in each of VM servers 232-236, aggregate message table stored in VVM server 252 may be updated from the condition shown in exemplary message table 700 to that shown in shown in aggregate message table 700'. The aggregate message table stored in VVM server 252 may then reflect the current state of messages from the many VM servers, such as work VM server 232, home VM server 234, and wireless VM server 236.

Figure 9B:
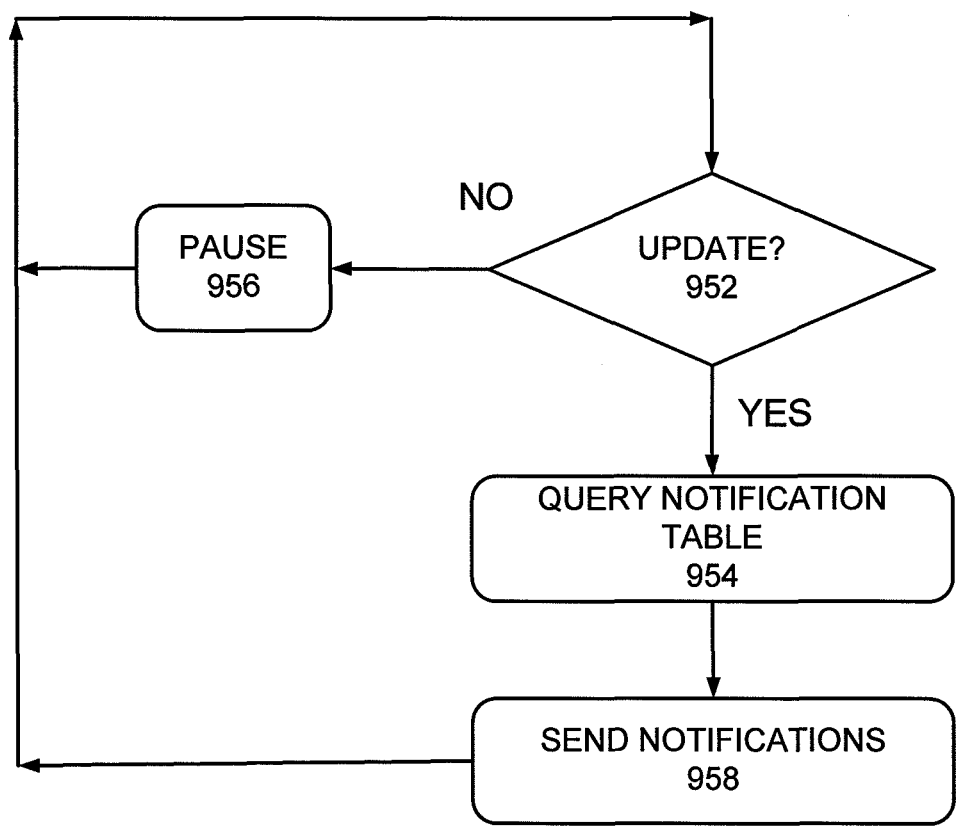

FIG. 9B is a flowchart of an exemplary process 900B for notifying a user device of voicemail message information. FIG. 9B is also described with respect to FIG. 10. Process 900B may begin when VVM server 252 updates its aggregate message table, such as aggregate message table 700. For example, as discussed above with respect to process 900A, VVM server 252 may have updated its aggregate message from the condition shown in aggregate table 700 to the state shown in updated aggregated message table 700' (e.g., to add record 760 associated with mailbox MBC1). If the aggregate message table has been updated (block 952: YES), then a notification table may be queried (block 954). VVM server 252 may query notification table 800 stored in SWD server 238 to determine which user devices should be notified of the change to the aggregate message table. In this example, as indicated in notification table 800, a notification for a new voicemail in mailbox MBC1 may be sent to the user device associated with device number 2022513434 (e.g., mobile phone 220), the user device associated with device number 7035678989 (e.g., smart phone 216), and the user device associated with device number 2023459292 (e.g., PDA 218).

Figure 10:
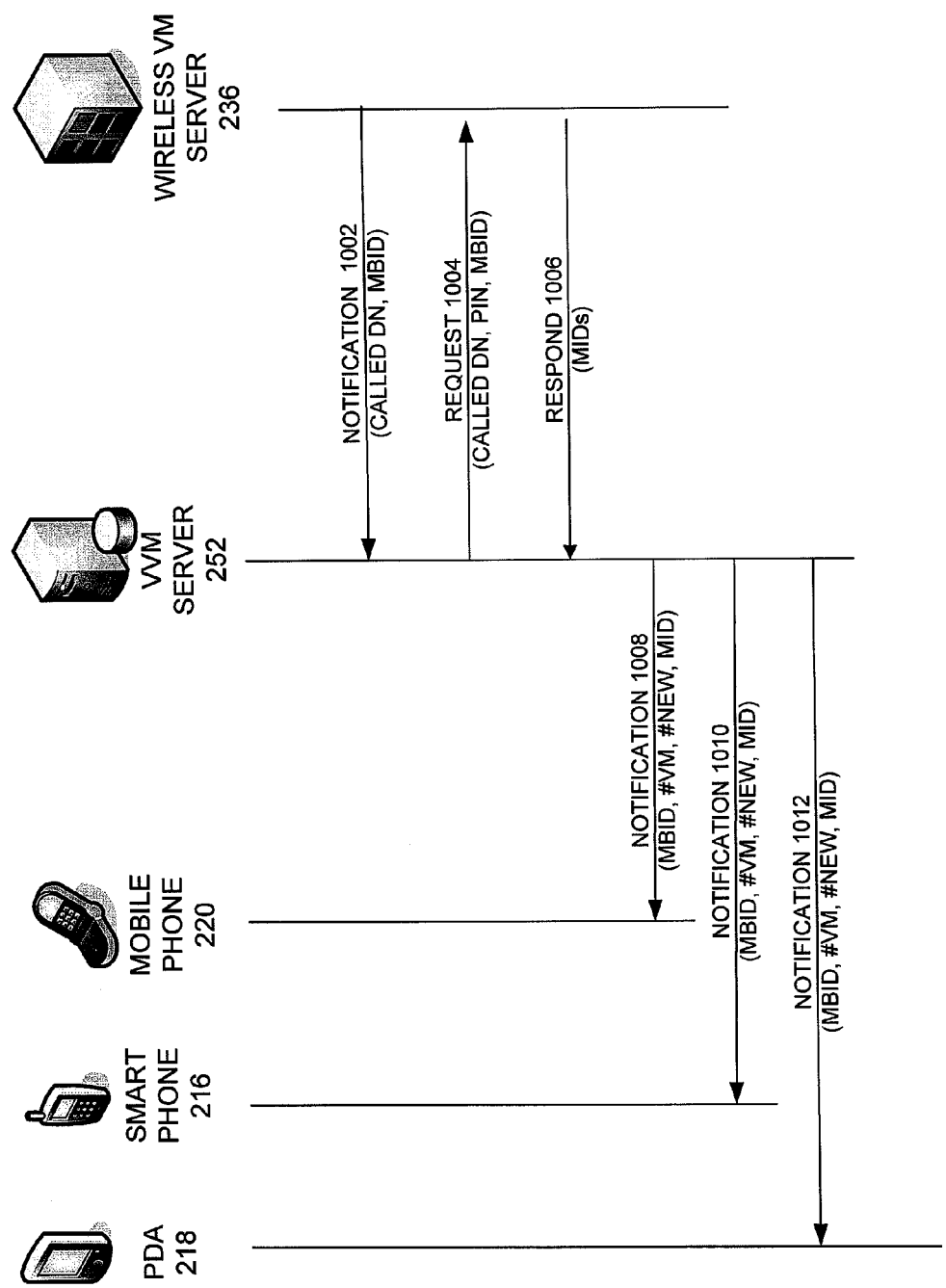
FIG. 10 is a diagram of exemplary network signals for notifying a user device of voicemail information.

One or more user devices may be notified (block 958). Exemplary notification messages are shown in FIG. 10, where VVM server 252 sends notification messages (signals 1008, 1010, and 1012) to mobile phone 220, PDA 118, and smart phone 216 (e.g., through device proxy 254 and/or SMPP gateway 256, shown in FIG. 2). In one embodiment, signals 1008 through 1012 may all include the same or similar information.

In one embodiment, the notification (e.g., signal 1008) may include, for a particular mailbox ID, the number of voicemail messages (#VM), the number of new messages (#NEW), and the message ID of the most recent new voicemail message. The notification (e.g., signal 1008) may also include the mailbox ID to which the notification signal corresponds (e.g., the mailbox ID associated with the change in the aggregate message table that may have resulted in the notification message). In one embodiment, the notification (e.g., signal 1008) may also include the message IDs of all the voicemail messages currently in the mailbox.

In one embodiment, VVM server 252 may send the notification to user device(s) in an order specified by a user in notification table 800. In another embodiment, VVM server 252 may send the notification first to the user device currently being used as measured by an accelerometer, for example. In yet another embodiment, VVM server 252 may determine which device is currently being used based on presence information stored in the user device, for example.

In one embodiment, the notification (e.g., signal 1008) may include an SMS message. In this embodiment, the SMS message (e.g., signal 1008) may include a BREW (Binary Run Time Environment for Wireless) application message in an SMS message. In another embodiment, the SMS message (e.g., signal 1008) may include a MWI (Mail Waiting Indicator) message.

After sending notifications (block 958), process 900B may return to block 952. In addition, if there has been no update to the aggregate message table (block 952: NO), then process 900B may pause (block 956) and may return to block 952.

As shown above with respect to process 900A, VVM server 252 may update its aggregate message table for mailboxes MBB1 and MBA1, as well as MBC1. These updates may also prompt a query to notification table 800 (block 954) and notifications being sent (block 958). In one embodiment, a notification (e.g., signal 1008) may include information for a group of mailbox IDs, such as MBB1, MBA1, and MBC1. For example, a notification signal may include, for a group of mailbox IDs, the number of voicemail messages (#VM) for each mailbox ID, the number of new messages (#NEW) for each mailbox ID, and the message ID of the most recent new voicemail message for each mailbox ID. In this embodiment, the notification (e.g., signal 1008) may also include the mailbox IDs to which the notification signal corresponds.

Figure 11:
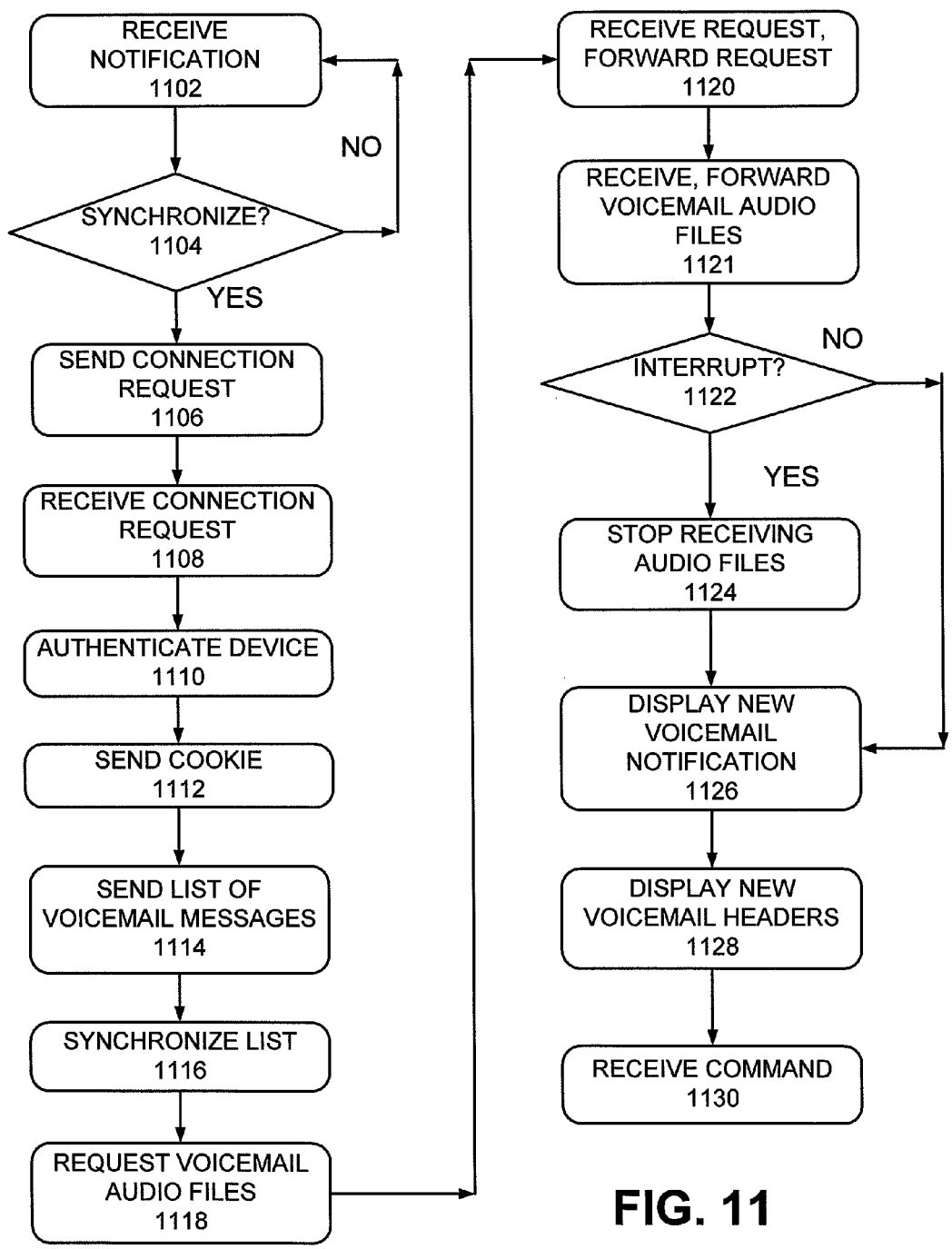
FIG. 11 is a flowchart of a process for synchronizing voicemail message information.
Figure 12:
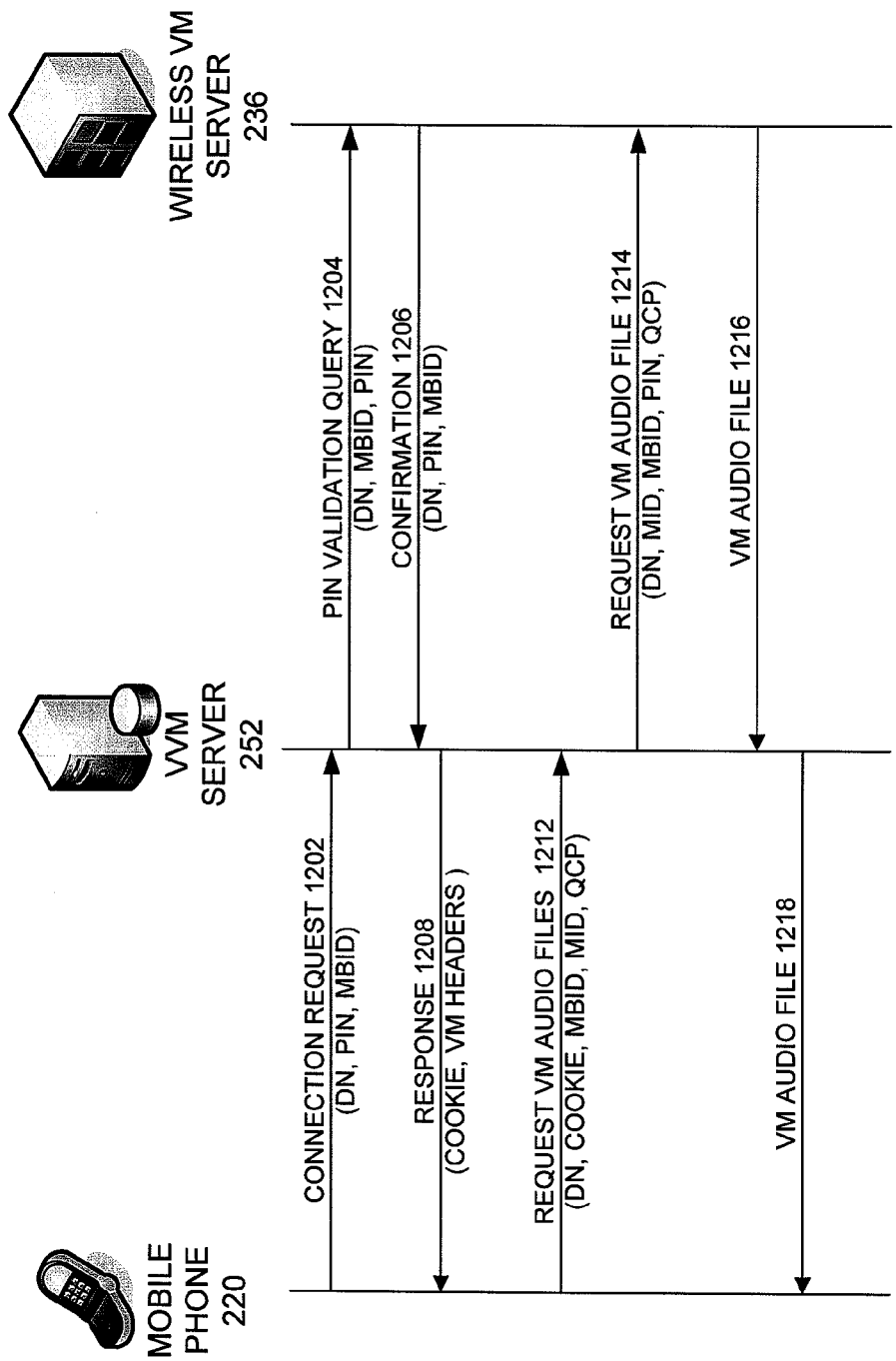
FIG. 12 is a diagram of exemplary network signals for synchronizing voicemail message information.

After receiving notification of voicemail messages, a user device may determine to download some or all of the voicemail message information identified in the notification. FIG. 11 is a flowchart of a process 1100 for receiving voicemail message information. All or parts of process 1100 may be performed by a user device, such as one of user devices 208-220, VVM server 252, or another device in network 200. Process 1100 is described with respect to FIG. 10 and FIG. 12, which are diagrams of exemplary network signals passed in network 200 for receiving a voicemail message and/or authenticating a user device. For the purposes of FIG. 12, device proxy 254, SMPP gateway 256, notification server 260, and VVM gateway 262 have been omitted for simplicity.

Process 1100 may start when a user device receives a notification message, e.g., signal 1008 (block 916). In one embodiment, the notification (signal 1008) may trigger the launching of VVM application 462. For example, the notification (signal 1008) may trigger the user device to perform process 1100.

A determination of whether to synchronize may be made (block 1104). For example, mobile phone 220 may receive the notification message (signal 1008) and may compare the information in the notification message (signal 1008) with information already stored in mobile phone 220. Mobile phone 220 may determine that it does not have the most recent voicemail message information (block 1104: YES) and may initiate a synchronization with VVM server 252 to receive the most recent voicemail information.

In one embodiment, the user device, e.g., mobile phone 220, may determine whether to synchronize or not based, for a particular mailbox ID, for example, on the number of unheard (e.g., new) messages, the total number of messages, and/or the newest message ID. In yet another embodiment, the user device, e.g., mobile phone 220, may determine whether to synchronize or not based, for a group of mailbox IDs, for example, on the number of unheard messages, the total number of messages, and/or the newest message IDs for the group of mailbox IDs. In another embodiment, the user device, e.g., mobile phone 220, may determine whether to synchronize or not based, for a particular mailbox ID, only on this information (i.e., the number of unheard messages, the total number of messages, and/or the newest message ID). Further, the user device, e.g., mobile phone 220, may determine whether to synchronize or not based, for a group of mailbox IDs, only on this information (i.e., the number of unheard messages, the total number of messages, and/or the newest message IDs for the group of mailbox IDs). In another embodiment, mobile phone 220 may determine whether to synchronize or not based on additional information, such as the full list of voicemail message IDs.

The notification (e.g., signal 1008) may include a message that the device should synchronize, without necessarily specifying any other information. In another embodiment, mobile phone 220 may determine whether to synchronize on a periodic basis no matter the information in the notification (signal 1008).

If the notification message (signal 1008), for example, includes a most recent message ID of which mobile phone 220 is unaware, then mobile phone 220 may decide to synchronize (block 1104: YES). If the notification message (signal 1008) indicates that the number of unheard messages is different than the information stored in mobile phone 220, then mobile phone 220 may decide to synchronize (block 1104: YES). If the notification message (signal 1008) indicates that the total number of messages is different than the information stored in mobile phone 220, then mobile phone 220 may decide to synchronize (block 1104: YES). In one embodiment, mobile phone 220 may display the number of unheard (e.g., new) voicemail messages and the total number of voicemail messages to the user of mobile phone 220.

For example, mobile phone 220 may include an aggregate message table in the state shown in aggregate message table 700, whereas VVM server 252 may include an aggregate message table in the state shown in aggregate message table 700'. The notification message (signal 1008) sent from VVM server 252 to mobile phone 220 may include information regarding aggregate message table 700', such as the total number of voicemail messages (e.g., 2 for mailbox ID of MBC1), the number of new voicemail messages (1 for mailbox ID of MBC1), and the most recent message ID (e.g., C130 for mailbox ID of MBC1). Mobile phone 220 may determine that synchronization should be performed because, comparing the received information (signal 1008) to the information in its aggregate message table (in the state shown in table 700), mobile phone 220 may have incomplete information. For example, the aggregate message table in mobile phone 220 would suggest the number of voicemail messages would be 1 (not 2) and there are no new voicemail messages (rather than 1). In one embodiment, the notification (signal 1008) may include three separate signals, e.g., one for each mailbox ID.

If the user device does not synchronize (block 1104: NO), then process 1100 may return to block 1102. If the user device decides to synchronize (block 1104: YES), then a login or connection request may be sent (block 1106). For example, mobile phone 220 may send a connection request (signal 1202) to VVM server 252 and/or device proxy 254. The connection request may be received (block 1108). For example, the connection request (signal 1202) sent by mobile phone 220 may be received by VVM server 252 and/or device proxy 254. In one embodiment, the connection request (signal 1202) may include a request for voicemail message headers (e.g., a list of voicemail messages). The request for a connection (signal 1202) may include the device number (e.g., for mobile phone 220), the mailbox ID, and/or a PIN. In one embodiment, the user of mobile phone 220 may be prompted for the PIN and/or the PIN may be stored in mobile phone 220 and automatically provided.

The user device may be authenticated (block 1110). To authenticate the user device, such as mobile phone 220, VVM server 252 and/or device proxy 254 may send a PIN validation query (signal 1204) to wireless VM server 236. The PIN validation query (signal 1204) may include the PIN and mailbox ID received from the user device, e.g., mobile phone 220, in the login request (signal 1202). Wireless VM server 236 may determine whether the PIN validation message (signal 1204) includes the correct PIN for the device number and mailbox combination. If the PIN validation message (signal 1204) includes the correct PIN, then a confirmation message (signal 1206) may indicate a successful user validation. If the PIN validation message (signal 1204) does not include the correct PIN, then confirmation message (signal 1206) may indicate a failed user validation (e.g., failed authentication). If successful, VVM server 252 and/or device proxy 254 may store the PIN, the mailbox ID, and the device number for subsequent communications with VM servers 232-236.

A cookie may be sent (block 1112). After successful authentication, VVM server 252 and/or device proxy 254 may respond to mobile phone 220 with a login response message (signal 1208). The login response message (signal 1208) may include the device number of mobile phone 220, mailbox ID of mobile phone 220, and a session cookie. In one embodiment, the session cookie may include an expiration time or be associated with an expiration time. For example, the session cookie may expire after fifteen minutes, one half of an hour, an hour, etc. In one embodiment, authentication server 258 may provide VVM server 252 and/or device proxy 254 with the session cookie for forwarding to mobile phone 220. In one embodiment, the session cookie may be used by mobile phone 220 in future communications to authenticate mobile phone 220. In one embodiment, VVM server 252 and/or device proxy 254 may communicate with authentication server 258 to validate any cookies received from mobile phone 220.

In one embodiment, if the user device, such as mobile phone 220, does not receive a response (signal 1208), then the user device may be in an environment where data transfers are not possible. In this situation, the user device may implement the traditional user interface (TUI) for receiving voicemail message, such as requiring the user to call one of VM servers 232-236. In this situation, the user may use the user device to call one of VM servers 232-236 directly through the TUI.

A list of voicemail messages may be sent (block 1114). For example, VVM server 252 may send a list of voicemail message headers (signal 1208). In one embodiment, the voicemail headers may include message IDs, mailbox IDs, caller device numbers, and the states of the messages (e.g., information stored in a message table). In one embodiment, the voicemail headers may be sent using XML data formatting.

For example, the voicemail message headers (signal 1208) sent to mobile phone 220 from VVM server 252 may include records 752 through 762 of aggregate message table 700. In one embodiment, signal 1208 may not include the audio files themselves (e.g., MSG*.QCP), but may include the names of the audio files. In another embodiment, signal 1208 may include the audio files themselves. In one embodiment, the voicemail message headers (signal 1208) sent to mobile phone 220 may include only the records from the aggregate message table (in VVM server 252) that have new or changed information. The voicemail message headers (signal 1208) may include headers only to those voicemail mailboxes for which the user device is configured to receive. For example, mobile phone 220 may be configured to receive message headers for mailboxes MBA1, MBB1, and MBC1 as configured and stored in SWD 238.

The voicemail message list may be synchronized (block 1116). Mobile phone 220 may compare the voicemail message headers received in signal 1208 with voicemail message information stored in mobile phone 220 and may update its message table. For example, mobile phone 220 may update its aggregate message table from the condition shown in message table 700 to that shown in aggregate message table 700'. If mobile phone 220 does not include a message table with any information, then mobile phone 220 may create a message table corresponding to aggregate message table 700'.

As a further example, if the voicemail message list (signal 1208) indicates that a particular message (identified by a message ID, for example) has been deleted and mobile phone 220 does not previously know this information, then mobile phone 220 may indicate (by updating message table) that the corresponding voicemail message has been deleted. If the voicemail message list (signal 1208) indicates that a particular message (identified by a message ID, for example) has been heard and mobile phone 220 believed it to have been new, then mobile phone 220 may update its message table to indicate that the voicemail message has been heard.

Voicemail message audio files may be requested (block 1118). For example, mobile phone 220 may determine that the voicemail message list received indicates that a new voicemail audio file exists (e.g., MSG9.QCP corresponding to record 762). Mobile phone 220 may not have the corresponding audio file, e.g., mobile phone 220 may only have the header information. In this situation, mobile phone 220 may send a request message (signal 1212) for the audio file to VVM server 252. The request message (signal 1212) may include the device number (e.g., of mobile phone 220), the session cookie from the earlier authentication, and the mailbox and message IDs for the requested voicemail audio file. In one embodiment, the request message (signal 1212) may include the file format that the user device supports, such as QCP, MP3, AAC, Ogg Vorbis, etc.

VVM server 252 may receive the request (signal 1212) and may send a request (signal 1214) for the audio files to the appropriate one of VM servers 232-236 (block 1120). The request to wireless VM server 236 (signal 1214) may include, for example, the device number (e.g., of mobile phone 220), the PIN stored in device proxy 254 and/or VVM server 252 after authentication, the message ID, the location, the requested file format (e.g., QCP), and the mailbox ID. In one embodiment, the user device requesting an audio file may be a different device than the user device associated with the mailbox ID. For example, mobile phone 220 (associated with wireless VM server 236) may request an audio file from home VM server 234 or work VM server 232, as well as wireless VM server 236.

Voicemail audio file(s) may be received and forwarded (block 1121). For example, VVM server 252 may receive the voicemail audio files (signal 1216) and may forward the audio files (signal 1218) to mobile phone 220. One embodiment, mobile phone 220 may send multiple audio file request messages (e.g., signal 1212) for each new voicemail message mobile phone 220 decides to download. In this embodiment, VVM server 252 may send multiple request messages (e.g., signal 1214) to wireless VM server 236, wireless VM server 236 may respond with multiple messages (e.g., signal 1216), and VVM server 252 may send multiple audio files (e.g., signal 1218) to mobile phone 220. In another embodiment, the audio file request message (signal 1212) may include multiple mailbox and/or message IDs to identify multiple audio files, e.g., an audio file associated with each message ID. In one embodiment, mobile phone 220 may prompt the user of the device before sending an audio file request signal (signal 1212) because the user may not want to spend the time and/or bandwidth, for example, to download multiple audio files.

The transmission of one or more voicemail audio files may be interrupted (block 1122). The user may interrupt the downloading of audio files by interrupting the VVM device application, for example. In this situation (block 1122: YES), the downloading of voicemail messages may be stopped (block 1124) and a new voicemail notification message may display on the user device, e.g., mobile phone 220 (block 1126). If the downloading of audio files is not interrupted (block 1122: NO), then a new voicemail notification message may be displayed (block 1126) to the user after successful download of the audio files. An exemplary new voicemail notification is shown in FIG. 1B, discussed above.

The voicemail message headers may be displayed (block 1128). The voicemail message headers may include the caller number, the called number, the mailbox ID, etc. An exemplary list of voicemail headers is shown in FIG. 1C, discussed above. In one embodiment, the voicemail message headers are displayed after the user acknowledges the new voicemail message notification message in block 1126 by, for example, touching one of control keys 308 or display 306 on mobile phone 220. Voicemail messages may be displayed in order of when they were received, in order of urgency, etc.

A command to act on a voicemail message may be received (block 1130). For example, the user of mobile phone 220 may listen to a voicemail message, delete a voicemail message, save a voicemail message, etc. The GUI shown in FIG. 1C, for example, includes buttons 114 and 116 for deleting and playing a voicemail message, respectively.

One or more of user device 208-220 may similarly make a determination of whether to synchronize or not (block 1102). A user device may initiate a synchronization process at any time, such as when the device is turned on, on a periodic basis, in response to a user action (e.g., selection of a button on the user device), etc.

After a user device downloads voicemail message information, the user may decide to listen to a voicemail message.

Figure 13:
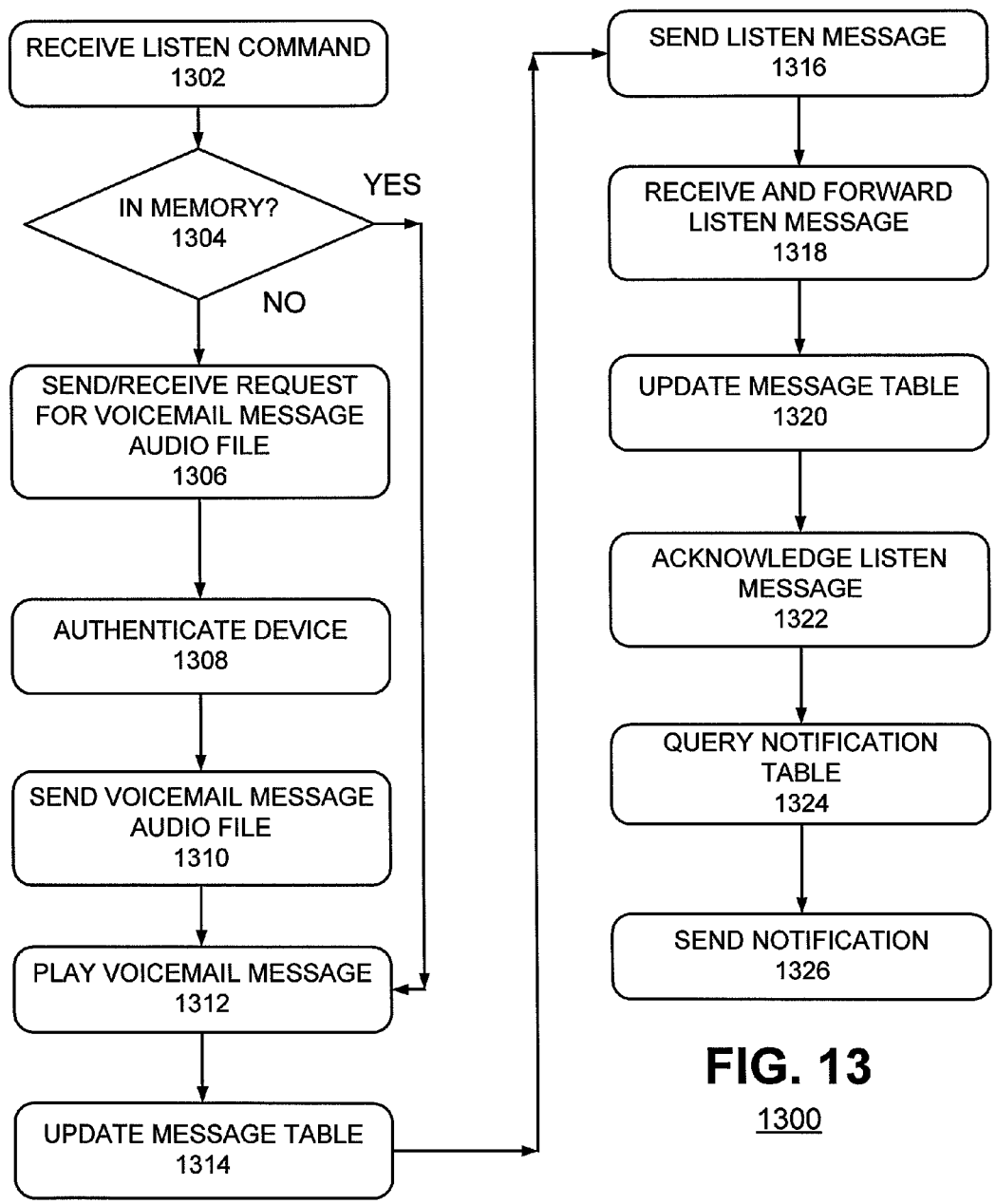
FIG. 13 is a flowchart of an exemplary process for listening to a voicemail message.

FIG. 13 is a flowchart of an exemplary process 1300 for listening to a voicemail message. Process 1300 is described with respect to FIG. 14, which is a diagram of exemplary network signals sent in network 200 for listening to a voicemail message. For the purposes of FIG. 14, device proxy 254, SMPP gateway 256, notification server 260, and VVM gateway 262 have been omitted for simplicity.

Process 1300 may begin when a user of a device, such as mobile phone 220, selects a message for listening to by, for example, using control keys 308, keypad 310, and/or touch-screen display 306. FIG. 1C shows a GUI for a user to input a command to listen to a message, for example. A LISTEN command may be received (block 1302). For example, a user device, such as mobile phone 220, may receive the LISTEN command from the user through the GUI shown in FIG. 1C. If the voicemail message audio file is in memory 460 of the user device (block 1304: YES), then the voicemail message may be played (block 1312). For example, mobile phone 220 may have already downloaded the voicemail message from wireless VM server 236 in block 1121.

If the voicemail message audio file is not in memory 460 of the user device (block 1304: NO), then the user device may request the audio file corresponding to the voicemail message. For example, mobile phone 220 may not have the corresponding audio file in memory 460 if the user interrupted the audio file download (FIG. 11, block 1122: YES) or if the user opted not to download the audio files. In this case, in one embodiment, mobile phone 220 may send an audio file request message, similar to signal 1212 of FIG. 12, to download the corresponding audio file (block 1306).

The user device may be authenticated (block 1308). For example, device proxy 254 and/or VVM server 252 may authenticate mobile phone 220 using, for example, a session cookie sent in the audio file request (similar to signal 1212). The audio file may be sent (block 1310). For example, VVM server 252 may send a request (similar to signal 1214) to wireless VM server 236 and may receive the audio file (similar to signal 1216). VVM server 252 and may send the audio file (similar to signal 1218) to mobile phone 220 for playing to the user (block 1312). In one embodiment, the audio file may be streamed from wireless VM server 236 to mobile phone 220 for playing to the user (block 1312).

The message table in the user device may be updated (block 1314), e.g., the state of the listened-to voicemail message may be changed. For example, the state of the voicemail message may be changed from NEW to HEARD or SAVE (e.g., in message table 464). A LISTEN message (e.g., a state change message) may be sent to a VM server (block 1316). For example, after playing the voicemail message, mobile phone 220 may send a LISTEN message (signal 1402) to VVM server 252. The LISTEN message (signal 1402) may include the device number (e.g., of mobile phone 220), the session cookie (for authentication), and the mailbox and message IDs corresponding to the listened-to message.

The LISTEN message may be received and forwarded (block 1318). For example, VVM server 252 may receive the message (signal 1402) and may forward the message (signal 1404) to VM server 236. The LISTEN message (signal 1404) sent to wireless VM server 236 may include the device number (e.g., of mobile phone 220), the message and mailbox IDs of the listened-to message, and the PIN corresponding to the mailbox ID. VVM server 252 and/or device proxy 254 may store the appropriate PIN, for example, for the corresponding mailbox ID. In one embodiment, the user device sending the LISTEN message may be a different device than the user device associated with the mailbox ID. For example, mobile phone 220 (associated with wireless VM server 236) may send a LISTEN message to home VM server 234 or work VM server 232, as well as wireless VM server 236.

The VM server may update the message table (block 1320) corresponding to the message ID. For example, wireless VM server 236 may update message table 600-3 to change the state of a message from NEW to HEARD. Likewise, VVM server 252 may also update its aggregate message table, such as message table 700, to change the state of the message from NEW to HEARD (e.g., VVM server 252 may change the status of the message in record 760 associated with mailbox MBC1 to HEARD). The LISTEN message may be acknowledged (block 1322). Wireless VM server 236 may send an acknowledgment message (signal 1406) to VVM server 252, which may be received and forwarded as an acknowledgment message (signal 1408) to the user device, e.g., mobile phone 220.

Figure 14:
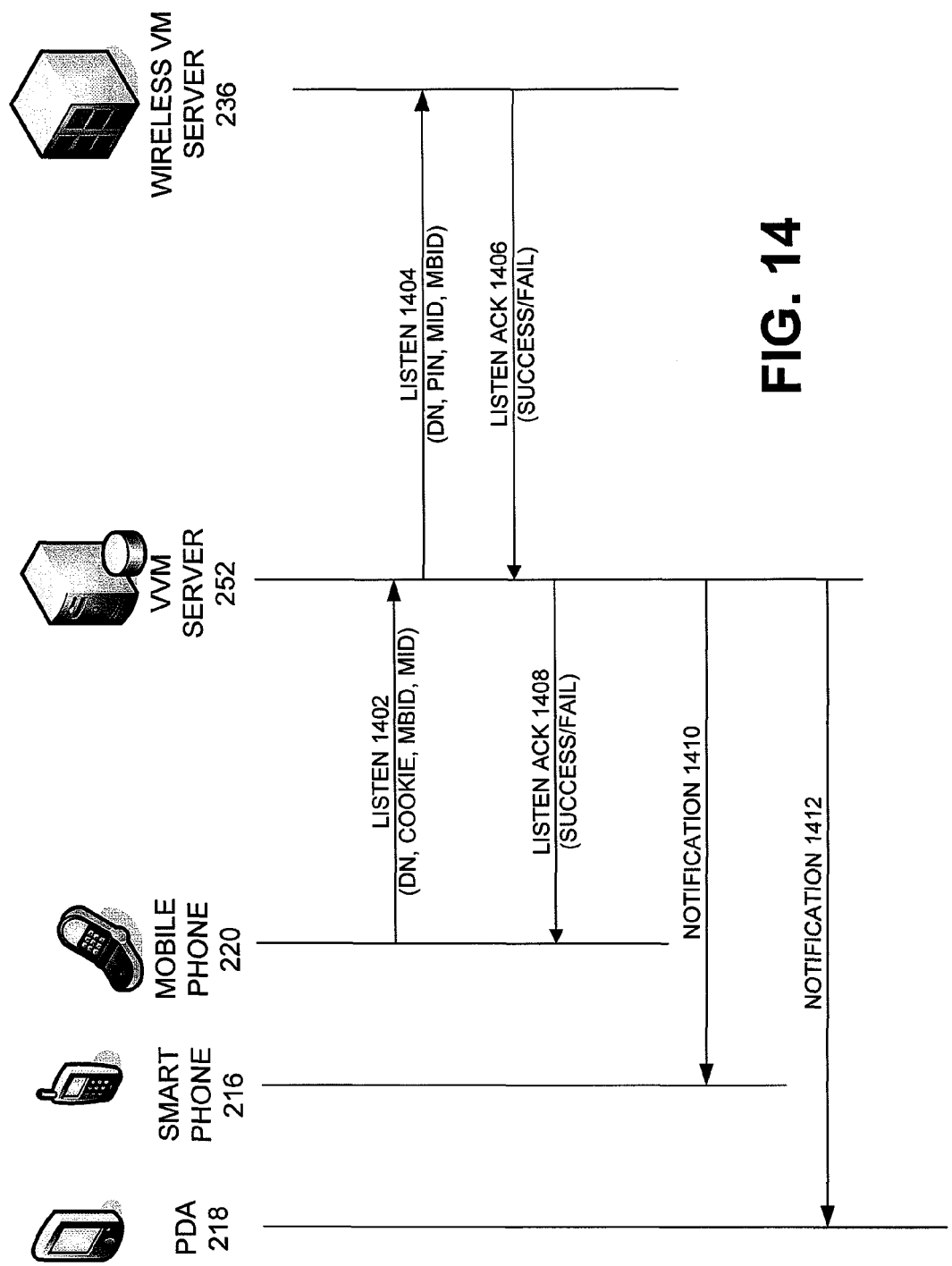
FIG. 14 is a diagram of exemplary network signals for listening to a voicemail message.

A notification table may be queried (block 1324). For example, VVM server 252 may query notification table 800 to determine which user devices, if any, should be notified of the update to the aggregate message table that may have taken place at block 1320. One or more notifications may be sent (block 1326). For example, if VVM server 252 changed the status of a voicemail message associated with mailbox MBC1 in response to a LISTEN message from mobile phone 220 (e.g., device number 2022513434), then VVM server 252 may query notification table 800 to determine that devices associated with device numbers 7035678989 (e.g., smart phone 216) and 2023459292 (e.g., PDA 218) may be notified of the change in state. As shown in FIG. 14, a notification message (signal 1410) may be sent to smart phone 216 and a notification message (signal 1412) may be sent to PDA 218. Signals 1410 and 1412 may include the same or similar information as the notification signal sent at block 958 of process 900B. Alternatively, the notification signals (signals 1410 and 1412) may include the mailbox ID, the message ID, and the corresponding change (e.g., indicative of the state change from NEW to HEARD). Therefore, multiple user devices may be kept up-to-date regarding information stored in the aggregate message table of VVM server 252.

In another embodiment, a user device (e.g., mobile phone 220) may update a VM server (e.g., wireless VM server 236) with state changes (e.g., a LISTEN message) at a different time, such as on a periodic basis or when the user terminates the VVM application in the user device. In one embodiment, the user device may not change the state of a message in its memory until it receives an acknowledgment from the VM server.

Figure 15:
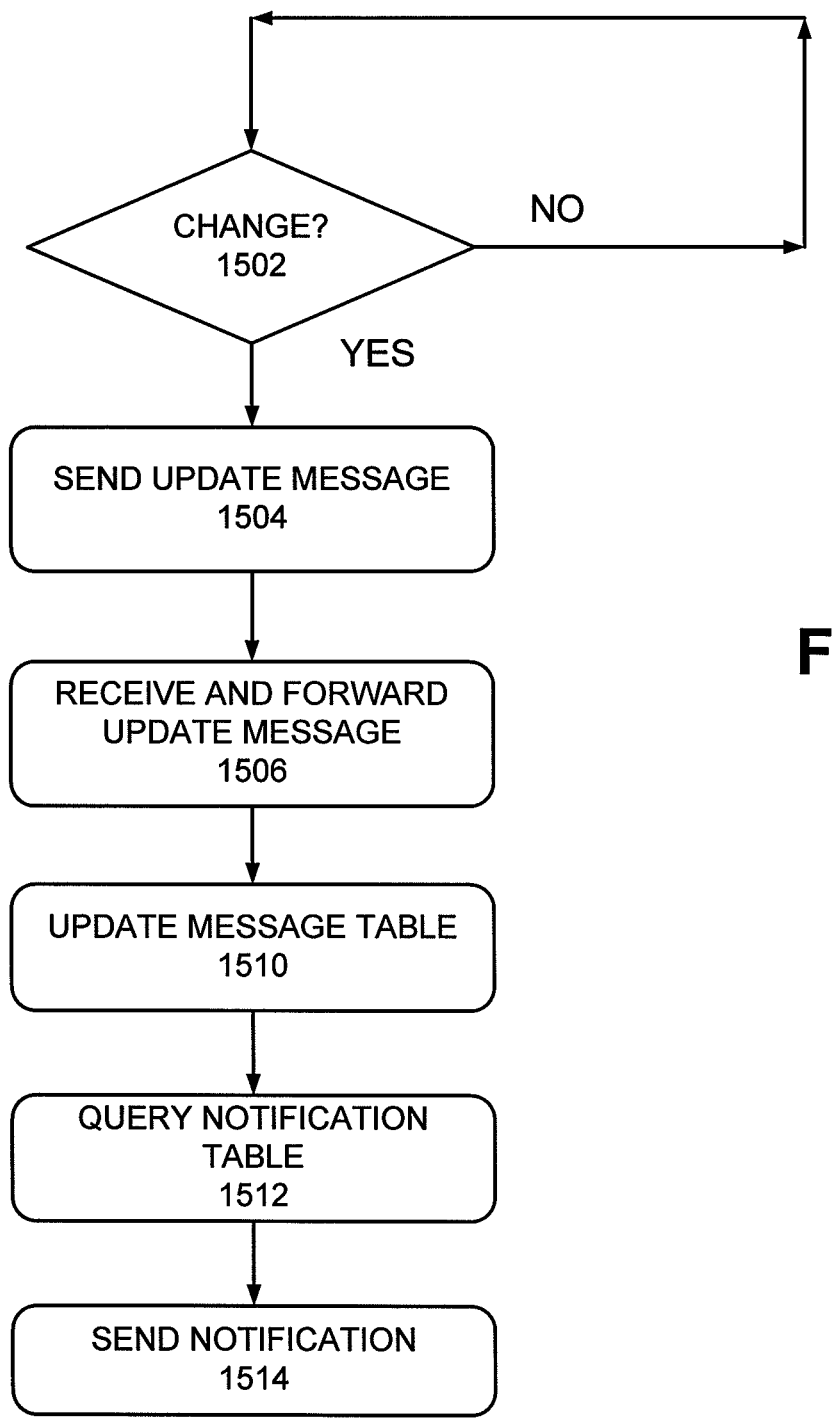
FIG. 15 is a flowchart of an exemplary process for changing the state of a voicemail message.

After a user device downloads voicemail message information, the user may perform various operations on a voicemail message, such as deleting or saving a voicemail message, that may change message tables in network 200. FIG. 15 is a flowchart of an exemplary process 1500 for updating or changing message tables in network 200. Process 1500 may begin after a user device receives a command to act on a voicemail message, for example, and updates the message table stored in the device. For example, a user may enter a command into a user device to change the state of a message from "SAVE" to "NEW." In this case, the user device may update its message table to change the state of a message from "SAVE" to "NEW." As another example, a user may enter a command into a user device to delete a message. In this case, the user device may update its message table to change the state of a message from "HEARD" to "DELETE." As yet another example, a user may enter a command into a user device to save a message. In this case, the user device may update its message table to change the state of a message from "HEARD" to "SAVE."

Process 1500 may be triggered by a change to any part of the message table stored in the user device (e.g., message table 464). If the message table changes (block 1502: YES), then an UPDATE message, e.g., a state change message, may be sent (block 1504). If there is no change in the message table (block 1502: NO), then process 1500 may wait until there is a change.

The UPDATE message may include a list of voicemail messages and the corresponding change and may be sent to VVM server 252 or any one of VM servers 232-236. The UPDATE message may identify the messages to update by their corresponding mailbox and message IDs. The UPDATE message may also include a session cookie to authenticate the user device, for example. Examples of UPDATE messages include the LISTEN, DELETE, and SAVE messages described above.

The UPDATE message may be received and forwarded (block 1506). For example, VVM server 252 may receive the UPDATE message and may be forwarded to the appropriate VM server. The message table may be updated (block 1510). For example, the VM server that received the UPDATE message may update its message table. In addition, VVM server 252 may also update the aggregate message table.

A notification table may be queried (block 1512). For example, VVM server 252 may query notification table 800, as described above with respect to block 954 and process 900B. VVM server 252 may determine which devices may be notified based on the mailbox ID of the voicemail message information that has been updated. Notification messages may be sent (block 1514). VVM server 252 may send a notification message, such as signals 1008-1012, to user devices identified by the query in block 1512. Such a notification message (sent at block 1514) may initiate process 1100 and the user devices may decide to synchronize as described with respect to process 1100. Therefore, a change to voicemail message information in one device may be reflected across all devices that may have access to the same voicemail mailbox. In one embodiment, VM server 252 may also, or alternatively, send a notification message, such as signal 902.

In one embodiment, methods and systems described above may allow for the management of email as well as voicemail.

U.S. patent application titled "MULTIPLE VISUAL VOICEMAIL MAILBOXES," filed the same day herewith, is incorporated herein by reference.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
one or more network devices including:
one or more memories including a first database to store voicemail message information associated with a voicemail mailbox, and a second database to associate a plurality of device numbers with the voicemail mailbox, wherein each of a plurality of communication devices is associated with a different one of the plurality of device numbers;
a receiver to receive a new voicemail message associated with the voicemail mailbox;
a processor to query to the second database to retrieve the plurality of device numbers associated with the voicemail mailbox; and
a transmitter to send a notification of the new voicemail message to each of the plurality of communication devices associated with the plurality of device numbers,
wherein the notification indicates a number of new voicemail messages associated with the voicemail mailbox, indicates a total number of voicemail messages associated with the voicemail mailbox, and includes an identifier of the new voicemail message,
wherein the notification causes each of the plurality of communication devices to determine whether or not to request a list of voicemail messages associated with the voicemail mailbox based on the number of new voicemail messages from the notification, the total number of voicemail messages from the notification, or the identifier of the new voicemail message from the notification,
wherein the notification causes one of the plurality of communication devices to determine to request the list of voicemail messages based on the number of new voicemail messages from the notification, the total number of voicemail messages from the notification, or the identifier of the new voicemail message from the notification, and
wherein the notification causes at least another one of the plurality of communication devices to determine not to request the list of voicemail messages based on the number of new voicemail messages from the notification, the total number of voicemail messages from the notification, or the identifier of the new voicemail message from the notification.

2. The system of claim 1, wherein the one of the plurality of communication devices includes a processor to determine whether to request the list of voicemail messages based on the number of new voicemail messages, the total number of voicemail messages, or the identifier of the new voicemail message.

3. The system of claim 2, wherein the processor of the one of the communication devices compares a list of voicemail message audio files stored in the one of the communication devices to the list of voicemail messages, and determines, based on the comparison, whether to request an audio file corresponding to one of the voicemail messages in the list of voicemail messages.

4. The system of claim 3, wherein the one or more network devices further includes:
a receiver to receive, from the one of the communication devices in response to the notification, a request for the list of voicemail messages associated with the voicemail mailbox, wherein the list of voicemail messages includes a state of each of the voicemail messages,
wherein the transmitter sends, to the one of the plurality of communications devices, the list of voicemail messages associated with the voicemail mailbox, the list of voicemail messages listing the new voicemail message.

5. The system of claim 4, further comprising the one of the plurality of communication devices.

6. The system of claim 1, further comprising:
a receiver to receive, from at least three of the plurality of communication devices in response to the notification, a request for the list of voicemail messages associated with the voicemail mailbox,
wherein the receiver receives, from the one of the plurality of communication devices, a state change message associated with one of the voicemail messages,
wherein the processor updates a state associated with the one of the voicemail messages in the first database based on the state change message.

7. The system of claim 6, wherein the state includes an indication of new, heard, saved, or deleted.

8. The system of claim 6, wherein the transmitter sends another notification to another one of the plurality of communication devices, the other notification indicative of the updated state.

9. The system of claim 8, wherein the other notification includes an updated indication of the number of new voicemail messages associated with the voicemail mailbox, an updated indication of the total number of voicemail messages associated with the voicemail mailbox, and an identifier of a most recent new voicemail message.

10. A method comprising:
storing a first database and a second database in one or more memories,
wherein the first database includes voicemail message information associated with a voicemail mailbox in a memory, the second database to associate a plurality of device numbers with the voicemail mailbox, and each of a plurality of communication devices is associated with a different one of the plurality of device numbers;
receiving a new voicemail message associated with the voicemail mailbox;
querying the second database to retrieve the plurality of device numbers associated with the voicemail mailbox; and
transmitting a notification of the new voicemail message to each of the plurality of communication devices associated with the plurality of device numbers,
wherein the notification indicates a number of new voicemail messages associated with the voicemail mailbox, indicates a total number of voicemail messages associated with the voicemail mailbox, and includes an identifier of the new voicemail message,
wherein the notification causes each of the plurality of communication devices to determine whether or not to request a list of voicemail messages associated with the voicemail mailbox based on the number of new voicemail messages from the notification, the total number of voicemail messages from the notification, or the identifier of the new voicemail message from the notification,
wherein the notification causes one of the plurality of communication devices to determine to request the list of voicemail messages based on the number of new voicemail messages from the notification, the total number of voicemail messages from the notification, or the identifier of the new voicemail message from the notification, and
wherein the notification causes at least another one of the plurality of communication devices to determine not to request the list of voicemail messages based on the number of new voicemail messages from the notification, the total number of voicemail messages from the notification, or the identifier of the new voicemail message from the notification.

11. The method of claim 10, further comprising determining, by the one of the plurality of communication devices, whether to request the list of voicemail messages based on the number of new voicemail messages, the total number of voicemail messages, or the identifier of the new voicemail message.

12. The method of claim 11, further comprising:
comparing, by the one of the plurality of communication devices, a list of voicemail message audio files stored in the one of the communication devices to the list of voicemail messages; and
determining, by the one of the plurality of communication devices, based on the comparison, whether to request an audio file corresponding to one of the voicemail messages in the list of voicemail messages.

13. The method of claim 11, further comprising:
receiving, from the one of the communication devices in response to the notification, a request for the list of voicemail messages associated with the voicemail mailbox; and
transmitting, to the one of the plurality of communications devices, the list of voicemail messages associated with the voicemail mailbox, wherein the list of voicemail messages lists the new voicemail message and includes a state of each of the voicemail messages.

14. The method of claim 10, further comprising:
receiving, from at least three of the plurality of communication devices in response to the notification, a request for the list of voicemail messages associated with the voicemail mailbox;
receiving, from the one of the plurality of communication devices, a state change message associated with one of the voicemail messages; and
updating a state associated with the one of the voicemail messages in the first database based on the state change message.

15. The method of claim 14, wherein the state includes an indication of new, heard, saved, or deleted.

16. The method of claim 14, further comprising transmitting another notification to another one of the plurality of communication devices, the other notification indicative of the updated state.

17. The method of claim 16, wherein the other notification includes an updated indication of the number of new voicemail messages associated with the voicemail mailbox, an updated indication of the total number of voicemail messages associated with the voicemail mailbox, and an identifier of a most recent new voicemail message.

18. A system comprising:
a communication device comprising:
  a receiver to receive a notification from a network device, the notification including an indication of a number of new voicemail messages in a voicemail mailbox, an indication of a total number of voicemail messages in the voicemail mailbox, and an identifier of a most recent new voicemail message in the voicemail mailbox;
  a processor to:
    determine to request a list of voicemail messages based on the number of new voicemail messages, the total number of voicemail messages, or the identifier of the most recent new voicemail message, wherein the list of voicemail messages includes a state of each of the voicemail messages, and
    determine not to request the list of voicemail messages based on the number of new voicemail messages, the total number of voicemail messages, or the identifier of the most recent new voicemail message; and
  a transmitter to send a request, when determined to request the list of voicemail messages, to the network device for the list of voicemail messages in the mailbox, wherein the receiver receives the list of voicemail messages in the mailbox from the network device;
  a memory to store voicemail message audio files and a corresponding list of voicemail message audio files, wherein the processor compares the list of voicemail message audio files to the list of voicemail messages and determines, based on the comparison, whether to request an audio file corresponding to one of the voicemail messages in the list of voicemail messages, and wherein the transmitter sends a request for the audio file to the network device.

19. The system of claim 18, wherein the transmitter sends, to the network device, a state change message associated with one of the voicemail messages in the mailbox for updating a state associated with the one of the voicemail messages in the mailbox based on the state change message.

20. The system of claim 18, further comprising the network device, wherein the state or the state change includes an indication of new, heard, saved, or deleted.

* * * * *